(12) United States Patent  (10) Patent No.: US 7,839,278 B2
Devadas et al.  (45) Date of Patent: Nov. 23, 2010

(54) VOLATILE DEVICE KEYS AND APPLICATIONS THEREOF

(75) Inventors: Srinivas Devadas, Lexington, MA (US); Thomas Ziola, Merlo Park, CA (US)

(73) Assignee: Verayo, Inc., Palo Alto, CA (US)

( * ) Notice: Subject to any disclaimer, the term of this patent is extended or adjusted under 35 U.S.C. 154(b) by 4 days.

(21) Appl. No.: 12/485,479

(22) Filed: Jun. 16, 2009

(65) Prior Publication Data

US 2009/0254981 A1  Oct. 8, 2009

Related U.S. Application Data

(63) Continuation of application No. 11/273,920, filed on Nov. 14, 2005, now Pat. No. 7,564,345.

(60) Provisional application No. 60/627,605, filed on Nov. 12, 2004, provisional application No. 60/629,953, filed on Nov. 22, 2004, provisional application No. 60/647,575, filed on Jan. 27, 2005.

(51) Int. Cl.
 *G08B 1/08* (2006.01)
(52) U.S. Cl. ...................... 340/539.1; 340/500; 340/501
(58) Field of Classification Search ................ 340/572, 340/10, 505; 713/200, 181, 189
See application file for complete search history.

(56) References Cited

U.S. PATENT DOCUMENTS

| | | |
|---|---|---|
| 4,985,614 A | 1/1991 | Pease |
| 5,177,352 A | 1/1993 | Carson et al. |
| 5,180,901 A | 1/1993 | Hiramatsu |
| 5,204,902 A | 4/1993 | Reeds, III et al. |
| 5,247,577 A | 9/1993 | Bailey |
| 5,375,169 A | 12/1994 | Seheidt et al. |
| 5,388,157 A | 2/1995 | Austin |
| 5,528,231 A | 6/1996 | Patarin |
| 5,768,382 A | 6/1998 | Schneier et al. |
| 5,818,738 A | 10/1998 | Effing |
| 5,862,094 A | 1/1999 | Kawabata |
| 5,883,956 A | 3/1999 | Le et al. |

(Continued)

FOREIGN PATENT DOCUMENTS

CA  2344429  3/2000

(Continued)

OTHER PUBLICATIONS

Anderson, Ross et al. "Low Cost Attacks on Tamper Resistant Devices". Cambridge University, Cambridge, England. Apr. 1997.

(Continued)

*Primary Examiner*—Travis R Hunnings
(74) *Attorney, Agent, or Firm*—Occhiuti Rohlicek & Tsao LLP

(57) ABSTRACT

A key is determined from a volatile response using circuitry on the device. The volatile response depend on process variation in fabrication of the device. Error control data that depends on the first volatile response can be computed, stored externally to the device, and then used to generate the key using a volatile response using the circuit. Applications of volatile keys include authentication and rights management for content and software.

51 Claims, 15 Drawing Sheets

U.S. PATENT DOCUMENTS

| | | | |
|---|---|---|---|
| 6,026,293 | A | 2/2000 | Osborn |
| 6,161,213 | A | 12/2000 | Lofstrom |
| 6,246,254 | B1 | 6/2001 | Choukalos et al. |
| 6,289,292 | B1 | 9/2001 | Charlton et al. |
| 6,289,453 | B1 | 9/2001 | Walker et al. |
| 6,301,695 | B1 | 10/2001 | Burnham et al. |
| 6,305,005 | B1 | 10/2001 | Burnham |
| 6,324,676 | B1 | 11/2001 | Burnham et al. |
| 6,363,485 | B1 | 3/2002 | Adams |
| 6,386,456 | B1 | 5/2002 | Chen et al. |
| 6,402,028 | B1 | 6/2002 | Graham, Jr. et al. |
| 6,535,016 | B2 | 3/2003 | Choukalos et al. |
| 6,738,788 | B1 | 5/2004 | Horng et al. |
| 6,802,447 | B2 | 10/2004 | Horng |
| 6,848,049 | B1 | 1/2005 | Tailliet |
| 6,898,708 | B2 | 5/2005 | Hori et al. |
| 6,941,180 | B1 | 9/2005 | Fischer et al. |
| 6,941,536 | B2 | 9/2005 | Muranaka |
| 7,005,733 | B2 | 2/2006 | Kommerling et al. |
| 7,131,001 | B1 | 10/2006 | Johnson |
| 7,143,436 | B2 | 11/2006 | Yamaguchi et al. |
| 7,191,339 | B1 | 3/2007 | Trimberger |
| 7,191,340 | B2 * | 3/2007 | Wuidart et al. ............... 713/189 |
| 7,210,634 | B2 | 5/2007 | Sapiro |
| 7,216,232 | B1 * | 5/2007 | Cox et al. ................... 713/176 |
| 7,239,226 | B2 * | 7/2007 | Berardi et al. ............. 340/5.61 |
| 7,243,236 | B1 | 7/2007 | Sibert |
| 7,249,108 | B1 | 7/2007 | Walmsley et al. |
| 7,251,730 | B2 | 7/2007 | Rose et al. |
| 7,577,850 | B2 | 8/2009 | Barr |
| 2001/0032318 | A1 | 10/2001 | Yip et al. |
| 2001/0033012 | A1 | 10/2001 | Kommerling et al. |
| 2002/0065574 | A1 | 5/2002 | Nakada |
| 2002/0095594 | A1 | 7/2002 | Dellmo et al. |
| 2002/0106087 | A1 | 8/2002 | Lotspiech et al. |
| 2002/0107798 | A1 | 8/2002 | Hameau et al. |
| 2002/0128983 | A1 | 9/2002 | Wrona et al. |
| 2002/0150252 | A1 | 10/2002 | Wong |
| 2002/0188857 | A1 | 12/2002 | Orlando et al. |
| 2003/0140241 | A1 | 7/2003 | England et al. |
| 2003/0204731 | A1 | 10/2003 | Pochuev et al. |
| 2003/0204743 | A1 * | 10/2003 | Devadas et al. ............. 713/200 |
| 2003/0219121 | A1 | 11/2003 | Van Someren |
| 2004/0148509 | A1 | 7/2004 | Wu |
| 2005/0051351 | A1 | 3/2005 | De Jongh et al. |
| 2007/0038871 | A1 | 2/2007 | Kahlman et al. |
| 2007/0039046 | A1 | 2/2007 | Van Dijk et al. |
| 2007/0044139 | A1 | 2/2007 | Tuyls et al. |
| 2008/0044027 | A1 | 2/2008 | Van Dijk |
| 2008/0059809 | A1 | 3/2008 | Van Dijk |
| 2008/0106605 | A1 | 5/2008 | Schrijen et al. |

FOREIGN PATENT DOCUMENTS

| | | |
|---|---|---|
| DE | 19843424 | 3/2000 |
| EP | 1100058 | 5/2001 |
| EP | 1341214 | 9/2003 |
| WO | WO00/17826 | 3/2000 |
| WO | WO01/50530 | 7/2001 |
| WO | WO02/13452 | 2/2002 |
| WO | WO02/45139 | 6/2002 |
| WO | WO03/107201 | 12/2003 |
| WO | 2004/066296 | 8/2004 |
| WO | WO2004/102302 | 11/2004 |
| WO | WO2004/104899 | 12/2004 |
| WO | WO2004/105125 | 12/2004 |
| WO | WO2004/114122 | 12/2004 |
| WO | WO2005/043805 | 5/2005 |
| WO | WO2005/048179 | 5/2005 |
| WO | WO2005/048256 | 5/2005 |
| WO | WO2005/059629 | 6/2005 |
| WO | WO2005/086158 | 9/2005 |
| WO | WO2006/038183 | 4/2006 |
| WO | WO2006/040724 | 4/2006 |
| WO | WO2006/067739 | 6/2006 |
| WO | WO2006/082540 | 8/2006 |
| WO | WO2006/129242 | 12/2006 |
| WO | WO2007/007229 | 1/2007 |
| WO | WO2007/023420 | 3/2007 |
| WO | WO2007/031908 | 3/2007 |
| WO | WO2007/036024 | 4/2007 |
| WO | WO2007/063473 | 6/2007 |

OTHER PUBLICATIONS

Anderson, Ross et al. "Tamper Resistance—a Cautionary Note". Cambridge University, Cambridge, England. Nov. 1996.

Boning, Duane S. et al., "Models of Process Variations in Device and Interconnect," Massachusetts Insitute of Technology, Cambridge, MA Aug. 23, 1999.

Devadas, Srinivas et al., "Synthesis of Robust Delay-Fault Testable Circuits: Theory" Massachusetts Institute of Technology, Cambridge, MA Jan. 1992.

Devadas, Srinivas et al., "Synthesis of Robust Delay-Fault Testable Circuits: Practice" Massachusetts Institute of Technology, Cambridge, MA Mar. 1992.

Gassend, B.L.P., Physical Random Functions; Thesis, Thesis at the Massachusetts Institute of Technology, pp. 1-89 (Feb. 1, 2003) XP002316843.

Gassend, Blaise et al., "Silicon Physical Unknown Functions and Secure Smartcards," Massachusetts Institute of Technology, Cambridge, MA May 13, 2002.

Gassend, Blaise et al. "Controlled Physical Unknown Functions: Applications to Secure Smartcards and Certified Execution," Massachusetts Institute of Technology, Cambridge, Jun. 10, 2002.

Xilinx (Ralf Krueger) "Using High Security Features in Virtex-II Series FPGAs" www.xilinx.com; [printed Jul. 8, 2004].

Lee et al., "A Technique to Build a Secret Key in Integrated Circuits for Identification and Authentication Applications," Massachusetts Institute of Technology (CSAIL) 2004.

Daihyun Lim, "Extracting Secret Keys from Integrated Circuits" Massachusetts Institute of Technology, Cambridge, MA, May 2004.

Milor et al., "Logic Product Speed Evaluation and Forecasting During the Early Phases of Process Technology Development Using Ring Oscillator Data", AMD, Sunnyvale, CA (Abstract).

Ranasinghe et al. "Securityand Privacy Solutions for Low-Cost RFID Systems" IEEE, pp. 337-342 (2004).

Pappu Srinivasa Ravikanth. "Physical One-Way Functions". Massachusetts Institute of Technology, Cambridge, MA. Mar. 2001.

Skoric et al., "Robust Key Extraction from Physical Uncloneable Functions," Proc. Applied Cryptography and Network Security 2005, LNCS 3531, pp. 407-422.

Sean W. Smith et al. "Building a High-Performance, Programmable Secure Coprocessor". IBM T.J. Watson Research Center, Yorktown Heights, NY. Oct. 16, 1998.

G. Edward Suh, et al., "Design and Implementation of the AEGIS Single-Chip Secure Processor Using Physical Random Functions,"In *the proceedings of the 32nd International Symposium on Computer Architecture*, Madison, Wisconsin, Architecture, Jun. 2005, (Memo-483).

Tuyls et al., "Security Analysis of Physical Uncloneable Functions," Proc. 9th Conf. on Financial Cryptography and Data Security , Mar. 2005, LNCS 3570, pp. 141-155.

Tuyls et al., "Information-Theoretic Security Analysis of Physical Uncloneable Functions," Proceedings ISIT 2004 (Chicago), p. 141.

Tuyls, Pim and Lejla Batina, "RFID-Tags for Anti-Counterfeiting," Topics in Cryptography, vol. 3860/2006, No. LNCS3860, (Feb. 13, 2005) XP002532233.

Hon-Sum Wong et al. "Three-Dimensional "Atomistic" Simulation of Discrete Random Dopant Distribution Effects in Sub-0.1µm MOSFET's".IEDM, 29(2):705-708, 1993.

Bennet Yee, "Using Secure Coprocessors," Carnegie Mellon University, Pittsburg, PA. May 1994.

Arazi, B. "Interleaving Security and Efficiency Considerations in the Design of Inexpensive IC Cards". IEEE Proceedings on Computers and Digital Techniques. vol. 141, Issue 5. Publ Date: Sep. 1994. pp. 265-270.

Omura, J.K., Novel Applications of Cryptogrtaphy in Digital Communications, IEEE Comm. Mag., May, 1990, pp. 21-29.

* cited by examiner

VOLATILE DEVICE KEYS AND APPLICATIONS THEREOF

CROSS-REFERENCE TO RELATED APPLICATIONS

The application is a continuation of U.S. application Ser. No. 11/273,920, filed Nov. 14, 2005, which claims the benefit of the following U.S. Provisional Applications: Ser. No. 60/627,605, filed Nov. 12, 2004; 60/629,953, filed Nov. 22, 2004; and 60/647,575, filed Jan. 27, 2005. Each of these provisional applications is incorporated herein by reference.

This application is also related to U.S. application Ser. No. 11/272,995, titled "Securely Field Configurable Device," filed on Nov. 14, 2005, which is also incorporated herein by reference.

This application is also related to U.S. application Ser. No. 10/407,603, titled "Authentication of Integrated Circuits," filed on Apr. 4, 2003, and published on Oct. 30, 2003, as US2003/0204743A1, which is also incorporated herein by reference.

BACKGROUND

Secret keys embedded in devices such as integrated circuits (chips) can be used to authenticate the devices. An example of such an approach uses a secret key embedded in a smart card. This secret key is not intended to be read out, but can be used to decrypt messages sent to the smart card. A service provider who knows the secret key can authenticate the smart card by asking it to decrypt an encrypted message or using other cryptographic protocols that verify that the smart card possesses the key. The secret key needs to remain secret so that an adversary cannot duplicate the key and assume a false identity.

For many applications, a secret key embedded in a chip does not have to be unique. The same key can be embedded into many chips when one merely wants to authenticate that a chip belongs to a particular set, and does not need to uniquely identify a particular chip or device or merely needs to decode content that has been broadcast in an identical format to a group of devices. One current practice has integrated circuits storing non-volatile keys in various types of Read-Only Memory (ROM) such as Programmable ROM, Electrically Programmable ROM, and Electrically Erasable Programmable ROM. In this case, each integrated circuit is programmed during or after manufacture to place the appropriate key in ROM.

An adversary may probe such a chip to attempt to find the secret key using invasive methods, such as removal of the package and layers of the integrated circuit, or non-invasive methods, such as differential power analysis that attempts to determine the key by stimulating the integrated circuit chip and observing the power and ground rails. To prevent physical invasion of the chip to determine non-volatile keys, powered sensing circuitry may be included in the packaging of the chip to detect intrusion and erase sensitive information upon detection of intrusion.

By designing a special-purpose or general-purpose processor with a secret non-volatile key embedded in it, it is possible to design software or media content that is specific to a processor chip or a set of processor chips that contain a particular key. For example, the software or media content cannot be run or played on other processor chips that do not contain the particular key. Requiring that instructions in the software or data items in the media file need to be decrypted by a particular key or periodically decrypted, possibly on an established schedule or protocol enables Digital Rights Management (DRM) applications.

Authentication of integrated circuits has been suggested using device characteristics that vary from device to device based on variation in the fabrication process. Some such approaches, which are bases on circuit delay are described in U.S. Application Publication US2003/0204743A1, titled "Authentication of Integrated Circuits," which is incorporated herein by reference. Threshold voltage variations in circuits fabricated on different integrated circuits have also been used to generate unique identifiers for individual chips, as described in U.S. Pat. No. 6,161,213, to Keith Lofstrom, titled "System for Providing an Integrated Circuit with a Unique Identification." However, Lofstrom's identifiers have limitations for use as secret keys in cryptographic applications because they may be exposed externally to the device and not be generated in a reliable enough fashion for use in cryptographic applications.

SUMMARY

In one aspect, in general, a method for determining a key on a device includes generating a first volatile response using circuitry on the device. The volatile response depends on process variation in fabrication of the device. First error control data that depends on the first volatile response is computed, and stored externally to the device. A second volatile response is generated using the circuitry on the device. The key is then generated using the externally stored first error control data and the second volatile response.

Aspects can include one or more of the following.

The first error control data includes a syndrome computed from the first volatile response.

Generating the key using the first error control data and the second volatile response includes one or more of providing the first error control data to the device, correcting the second volatile response using the provided first error control data to yield the first volatile response, and generating the key using the corrected second volatile response.

Generating the key using the first error control data and the second volatile response includes one or more of computing second error control data that depends on the second volatile response, providing the second error control data from the device, combining the first error control data and the second error control data outside the device to produce correction data, providing the correction data to the device, correcting the second volatile response using the correction data to yield the first volatile response, and generating the key using the corrected second volatile response.

In another aspect, in general, a method for sharing a secret with a device features providing a public key to the device, generating a volatile response in the device, and encrypting the volatile response using the public key. The encrypted volatile response is received from the device decrypted using a private key corresponding to the public key.

Aspects can include one or more of the following.

The volatile response is generated based on the public key. For example, the same volatile response cannot be generated using a different public key, or at least such a different public key can be exceedingly hard to find.

A quantity is provided to the device for combining with volatile response to generate the secret in the device.

The quantity for combining with the volatile response is insufficient to determine the secret.

In another aspect, in general, a method for key generation on a device includes generating a private key and a corresponding public key on the device without permitting disclosure of the private key outside the device. The private key not determinable from non-volatile quantities stored on the device. The public key is disclosed from the device. A second volatile response is generated using circuitry on the device, the volatile response depending on process variation in fabrication of the device. The private key is regenerated on the device using the second volatile response.

Aspects can include one or more of the following.

Generating the private key includes determining the private key using a first volatile response using the circuitry on the device.

Generating the private key includes generating a random number on the device, determining the private key using the random number, and determining a quantity for combining with the second volatile response in regenerating the private key.

A quantity is determined on the device for use in generating the private key from the second volatile response, and stored outside the device.

In another aspect, in general, a method includes generating a first volatile response on each of a set of device. The volatile responses depend on process variation in fabrication of the devices. Data is stored outside the devices associating the devices with quantities that depend on the respective first volatile responses. One of the devices is laterauthenticated. This authentication includes generating a second volatile response on the device, and comparing a quantity that depends on the second volatile response with a quantity in the stored data.

Aspects can include one or more of the following.

The method includes determining whether the stored quantity that depends on the first volatile response for the device matches the quantity that depends on the second volatile response for the device.

The quantity that depends on the first volatile response includes a non-invertible function of the first volatile response, for example, the non-invertible function includes a public key encryption of the first volatile response.

In another aspect, in general, a method for authenticating a device includes a first entity authenticating a first device using a first authentication method. While authenticated using the first authentication method, a shared secret is established between the first entity and the device, the shared secret being volatile on the device. While no longer authenticating the first device using the first authentication method, the first device is authenticated using a second authentication method. This second authentication method includes regenerating the shared secret based on a volatile response of circuitry on the device that depends on process variation in fabrication of the device based on the first device.

Aspects can include one or more of the following.

Establishing the shared secret includes receiving a quantity that depends on the volatile response from the first device at the first entity.

A quantity is provided from first entity to the device for combining with the volatile response to regenerate the shared secret.

The first authentication method includes confirming connection of the first device to the first entity. For example, this includes connecting the first device to the first entity using a dedicated communication link.

In another aspect, in general, a method for authenticating a device includes authenticating the device by a first entity. A first secret shared is established between the first entity and the device, the first secret in the device being volatile. The device is then authenticated by a second entity. This authenticating includes using the first shared secret to establish a second shared secret shared between the second entity and the device.

Aspects can include one or more of the following.

Authenticating the device by the second entity includes withholding from the second entity information allowing the second entity to determine the first secret.

Authenticating the device by the second entity includes receiving a quantity dependent on the first secret from the first entity, and verifying that the device is the source of a message using the received quantity.

The first entity verifies using the first secret that the device is the source of a message to the second entity.

In another aspect, in general, a device includes a volatile key generator for generating a decryption key. The device is configured to prevent disclosure of the generated decryption key outside the device. The device also includes a decryption unit that is coupled to the key generator. The decryption unit accepts the decryption key from the key generator. An interface for accepting encrypted content at the device provides the encrypted content to the decryption unit. A converter processes the decrypted content.

The device also includes an interface for providing the processed decrypted content from the device.

Aspects can include one or more of the following.

The content includes at least one of audio content and video content.

The converter includes a digital-to-analog converter.

The processed decrypted content includes an analog signal.

The processed decrypted content is insufficient to recreate the decrypted content.

In another aspect, in general, a device includes an interface for coupling the device to a processing system. A volatile key generator in the device generates a decryption key. The device is configured to prevent disclosure of the generated decryption key outside the device. The device includes a decryption unit coupled to the key generator for accepting the decryption key to decrypt information, including encrypted instructions, received over the interface from the processing system. A processor is coupled to the decryption unit. The processor executes the instructions and provides a result of the execution of the instructions on the device to the processing system.

The device may form a dongle for attaching to the processing system, or a card for insertion into a connector in the processing system.

In another aspect, in general, a method includes distributing software for execution on a processing system, and distributing a device for coupling to the processing system. The software is executed on the processing system. During execution, encrypted instructions are passed from the processing system to the device. A volatile key is generated on the device, and the instructions are decrypted on the device. A result that depends on the decrypted instructions is passed from the device to the processing system. Execution of a portion of the software on the processing system is permitted only if the passed result matches a predetermined result.

Aspects can include one or more of the following.

The result includes the decrypted instructions.

The result includes a result of executing the decrypted instruction on a processor on the device.

In another aspect, in general, a proximity device includes circuitry for generating a volatile response that varies among devices fabricated according to a common design. The device includes programmable storage for data and a radio interface providing remote access to the stored data and to the volatile response.

Aspects can include one or more of the following.

The device is a radio frequency identification device (RFID).

The circuitry for generating the volatile response consists of fewer than 100 logic gates.

In another aspect, in general, a method includes storing information in a storage of a proximity device via a radio interface of the device. A volatile response of a circuit on the device is accessed via the radio interface. The volatile response varies among devices fabricated according to a common design. Data associating the volatile response and the stored information is stored outside the proximity device.

Aspects can include one or more of the following.

The stored information and a volatile response of the circuit are accessed via the radio interface The retrieved stored information and volatile response are verified to match the stored data.

Accessing the volatile response includes providing an input value via the radio interface to the device and providing the input value to the circuit for generating the volatile response.

In another aspect, in general, a method for generating reliable volatile keys includes exploiting process variations and using error correction.

In another aspect, in general, an arbitrary reliable volatile key is programmed or re-program into a hardware device.

In another aspect, in general, a method for authenticating legitimate devices includes creating lists of public identifiers corresponding to legitimate devices where the identifiers correspond to secret keys encrypted with service provider's public key. The secret keys can be volatile keys generated on the devices.

In another aspect, in general, a method for authenticating legitimate devices includes placing a specific or common key in each legitimate device without exposing secret information to an eavesdropping adversary. The specific or common key can be generated on the device using a volatile response of a circuit on the device.

In another aspect, in general, a volatile key generator is integrated with a processor on a smart card, satellite access card, or wireless mobile devices for media rights management and/or software copy protection.

In another aspect, in general, keys for multiple and diverse applications are generated simultaneously and in the same device.

One or more of the following advantages may be obtained.

By using error correction algorithms, it is possible to generate a reliable volatile key from the output of a circuit that is dependent on random or systematic process variations. For example, a circuit that generates a response that exhibits significant variability over different times on one device can nevertheless provide sufficient unpredictability from device to device (i.e., in its distribution) to be useful in generating a reliable unpredictable key.

Using appropriate protocols, a service provider or other entity to share this secret key with any device that includes a volatile key generator. Once this secret has been shared, a secure channel can be created between the service provider and the device, and other secrets can be shared, or encrypted messages exchanged, and a host of applications are possible.

A device can generate a volatile key in reliable fashion, and share this key with a specific service provider or between designated devices across an insecure channel, which may have eavesdroppers by encrypting the volatile key with a hard-coded public key of the service provider. Only the specific service provider will know the key.

A device can generate multiple volatile keys in reliable fashion, and share each key with a particular service provider or between designated devices across an insecure channel, which may have eavesdroppers by encrypting each key with the public key of the service provider. Only the corresponding service provider will know each specific key.

Providing a way for a first entity to introduce an authenticated device to a second entity can avoid duplication of authentication procedures between the second entity and the device and/or provide an increased level of authentication between the second entity and the device.

Integrating a key generator with a processor so the processor can generate volatile secret keys either for internal use or to share them with specific entities enables applications such as smart cards, satellite access cards, Digital Rights Management and software copy protection. The generation of keys for applications that can be different and distinct from any other keys used by other applications in a device, system or network, and which can be used individually and separately to generate their own secondary and session keys as distinct from any secondary and session keys generated from other primary source keys provides additional layers of intrusion prevention for system designers as well as a measure of protection between different service providers and applications.

An arbitrarily large number of multiple security services in a device can be supported simultaneously. For example, one or more of the following can be simultaneously supported: authentication for access to the Internet or other network resources, encryption of local storage by end-users and/or service providers, provisioning mobile telephone services, activating digital cameras and mobile phone handsets, downloading content to authenticated devices, signing of financial transactions with multiple financial institutions, usage in sensory networks or proximity transaction systems, component-to-component registration & authentication (such as for memory and other peripheral devices with a handset or computer), and in each instance, or simultaneously, using the same or different primary security keys and secondary or session keys as other applications.

Generated volatile keys can be utilized by existing or proposed digital rights management systems offered by private third parties or promoted by industry alliances including systems for trustworthy computing and digital certificate schemes that utilize keys created or stored in hardware for purposes such as authentication, computer resource management, encryption, end-user privacy protection, and general digital rights management (for example, Microsoft DRM, ARM's TrustZone, the Trusted Computing Group's TPM, the Open Mobile Alliance DRM, high definition DVD content rights management, and conditional access systems for digital cable and satellite, as well as Internet Protocol-based television [IPTV] systems) or for interoperable DRM schemes such as the Marlin Joint Development Association's interoperable DRM and its future enhanced versions (e.g., the Coral system) through use of shared keys across networks or simple re-issuance.

Other features and advantages of the invention are apparent from the following description, and from the claims.

DESCRIPTION

1 Volatile Key Generation

Figure 1A:
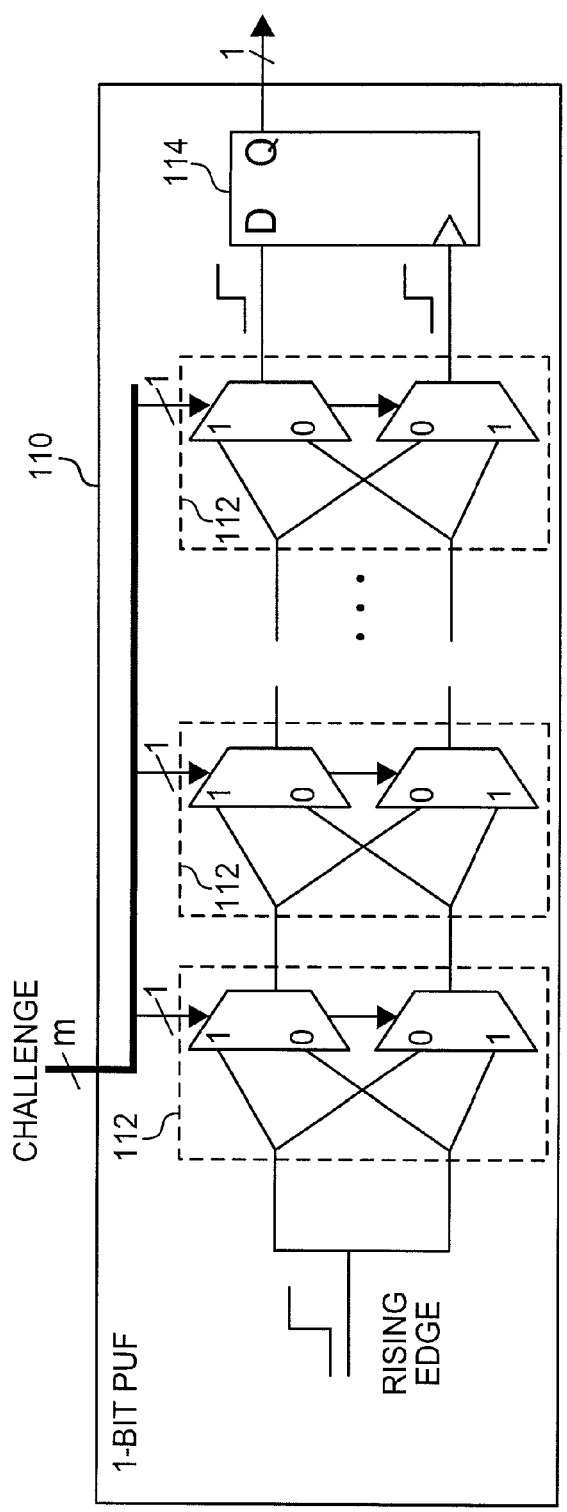
FIG. 1A is a physically unpredictable (PUF) circuit that outputs one bit.

Due to manufacturing process variation, which can be random and unpredictable, no two integrated circuits are exactly identical even though they have been fabricated using the same layout mask. By designing an integrated circuit chip with a set of multiple measurable physical characteristics that are difficult to duplicate accurately in manufacturing, it is possible to generate secret keys by selectively measuring a subset of the physical characteristics. The measured results can be used to generate bits of a key. This generation and measurement circuit produces a secret key that is inseparable from the chip itself. Such secret keys not stored in a non-volatile storage device and are regenerated when they are needed. That is, they only exist when the circuit is powered up. Different chips typically generate different keys without having to be programmed differently because of systematic or random process variation. The key generated on a particular chip is not easily predictable. It might be the same as the key generated by another circuit, or may not be, and if properly designed would unlikely be the same. Provided the volatile keys can be generated in a reliable manner, these keys can be used for any application where non-volatile keys have conventionally been used, including authentication, sharing of a specific key, certified execution, Digital Rights Management, managing private networks, sensor networks, device-peripheral pairing (e.g., for printer cartridge or power supply pairing), and software licensing applications.

The key generator can be integrated with (e.g., provide an input to) programmable functions including, but not limited to, encryption, decryption, hashing and other control functions to enable any application that uses non-volatile keys.

Variation in the manufacturing process causes changes in physical dimensions as well as changes in device parameters including resistance, capacitance, and threshold voltage. This variation manifests itself as differences in currents through identically designed transistors or wires, or voltages across identically designed transistors or wires. For example, a capacitive charging delay or a transistor threshold voltage can be determined by such variation. This variation has been exploited to design circuits that produce digital responses that vary from chip to chip, even in chips that are fabricated using the same layout mask.

One circuit that can be used to generate a unique identifier incorporates an array of transistors in a chip. The threshold voltages of the transistors in the array are measured by the circuit, which outputs comparisons of measurements as the identifier. Due to process variations in the fabrication of the chip, no two chips will have arrays of transistors whose threshold voltages are exactly the same. For a given number of chips made from the same lithography masks, if the number of transistors in the array is large enough, the identifiers generated on different chips from the array will be with high probability unique. In order to generate a useful secret key from an identifier, the identifier does not have to be unique, but merely unpredictable for any given chip.

Many other types of circuits that generate unique and unpredictable identifiers are also possible. Such circuits include ring oscillators that measure the delay of particular paths comprised of wires and transistors.

Examples of circuits to produce responses that vary from chip to chip are a pair of wires whose delays are compared to produce a Boolean value of 0 or 1 using a latch/arbiter, and pairs of resistances and/or capacitances whose values are compared. Such circuits are inherently noisy and therefore their outputs must be corrected in order to repeatedly generate reliable keys. Other examples of circuits that can be used to generate unpredictable values are described in U.S. Patent Publication US2003020473 A1 and in U.S. Pat. No. 6,161, 213.

A circuit 110 for generating a volatile key is shown in FIG. 1A. This type of circuit is referred to as a Physical Random Function or Physical Unclonable Function (PUF) circuit. The circuit has m stages 112, with m typically being 64 or greater. Each m-bit challenge creates two paths through the circuit, which are excited simultaneously. The one-bit digital response of 0 or 1 is based on a comparison of the path delays by a latch 114, which is used as an arbiter. Because the delays of wires and multiplexers are statistically distributed across different chips that are fabricated using the same lithography masks, the outputs of different chips for the same input challenge are different with a certain non-zero probability. In a particular chip, the path ending at the top input to the arbiter may be faster than the bottom path, but in another chip, the bottom path may be faster. Multiple different m-bit challenges can be applied to the PUF circuit 110, and multiple bits can thereby be generated because each different challenge excites a different pair of paths and compares their delays.

Figure 1B:
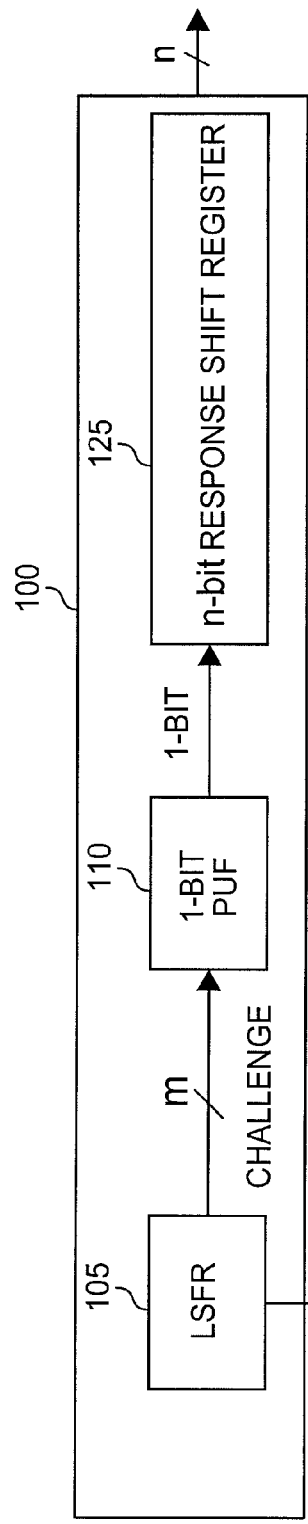
FIG. 1B is a multi-bit key generator.

The PUF circuit 110 can be replicated n times to produce n-bit response for a challenge applied to each of the n copies. Alternately, n challenges can be applied to one PUF circuit to produce an n-bit response. Referring to FIG. 1B, to form a key generator 100 the n challenges can be generated from a challenge seed using a linear-feedback shift register (LFSR) 105, or alternatively a non-linear feedback register, or even a shift-register without feedback. Each output bit of the one-bit PUF 110, which corresponds to a different one of these n challenges, is stored in an n-bit output shift register 125. This output of the shift register is the generated volatile key. This volatile key will likely vary from chip to chip.

In general, circuits that produce output bits (e.g., volatile keys) based on circuit parameters are noisy. That is, the same circuit on the same chip may generate somewhat different outputs at different times. Due to environmental variations such as temperature or power supply voltage, aging effects, or due to drift in threshold voltage, the exact same key is not necessarily generated even when the same set of challenges is applied repeatedly. The same key is not necessarily generated when there are changes in the environment such as ambient temperature and power supply voltage. This precludes the use of the circuit output directly as a key in cryptographic applications, where every single bit of the key has to be generated to be exactly the same, every time the key is used.

Any of a variety of circuits that produces multiple-bit responses that vary from chip to chip can be used—this circuit can even be a constant function, i.e., with no external (challenge) input forming a single key generator. The only requirement on the circuit is that the n-bit response should be hard to predict for any given chip; this means there has to be variation across chips. The number n should be large enough to preclude exhaustive enumeration of all possible responses. If n is small, the secret key may be too short for some applications. The error rate of response should not be so high that we cannot create an error correcting code, as we will describe below to compensate for variation of the key within one chip. There is no requirement for uniqueness of n-bit responses across chips since response is not exposed and the same or different secrets can be shared with different entities with the same response using appropriate methods.

Figure 2:
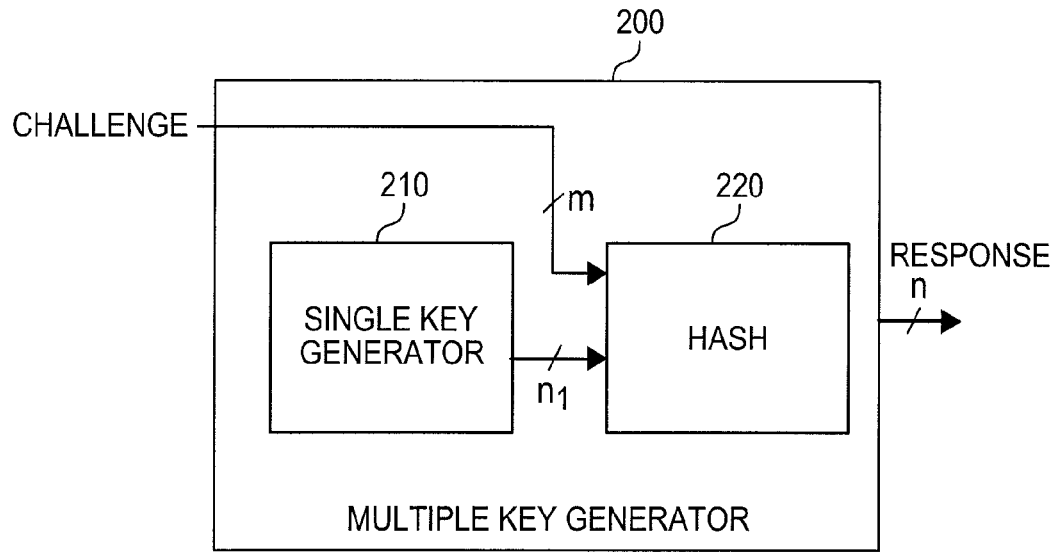
FIG. 2 is a key generator.

A key generator 210 that generates a single key of n-bits, but that does not take a controllable challenge input can be converted into a key generator 200 that generates any of many possible keys by adding logic 220 that modifies the output of the single key generator as shown in FIG. 2. The logic may, for example, correspond to a one-way hash function, a random hash function, or an encryption function. The resulting multiple key generator can be treated as a key generator that takes in a challenge and produces a volatile key as its response of the type shown in FIG. 1B. Therefore, even a PUF circuit that does not have any inputs and produces a single multibit response can be used to generate many responses and keys. The desirable characteristic for this added logic 220 is that it is hard to invert. That is, given a response it should be computationally hard to find the challenge and single key that produced the response.

Figure 3:
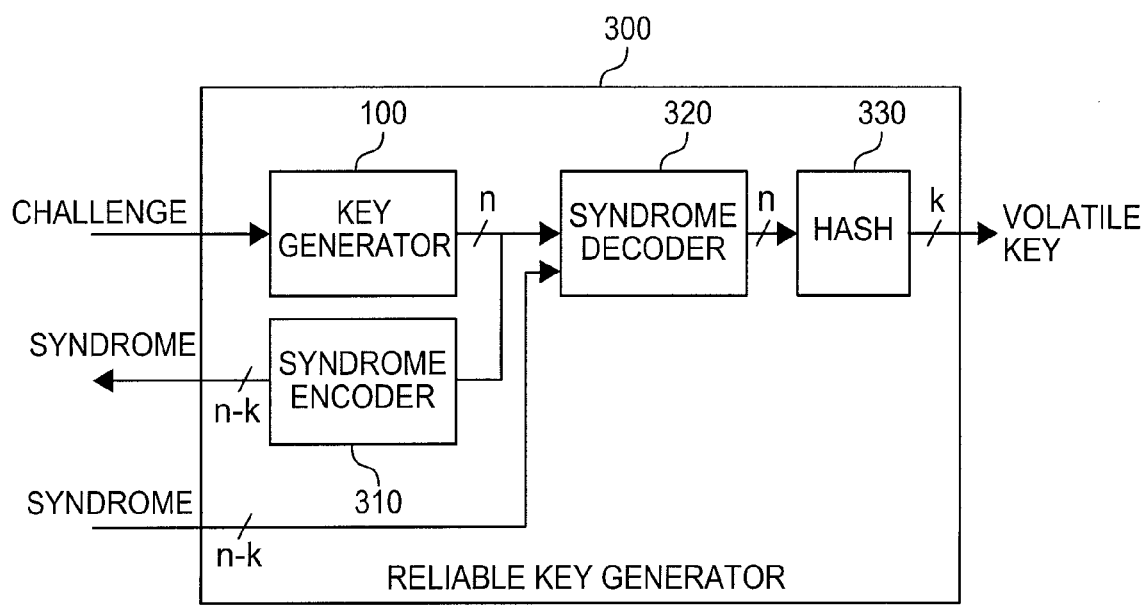
FIG. 3 is a reliable key generator with error correction.

In order to make the output of the key generator reliable, error correction can be used to compensate for a key generator circuit whose response varies from chip to chip but that is also noisy. Referring to FIG. 3, the key generator 100 can generate a single potentially noisy n-bit response when the same challenge input is provided to the key generator. Depending on the amount of noise, varying levels of error correction may be required; if a key generator is noise-free then error correction is not required. Any of a variety of types of error correction algorithm can be used, including BCH error correction, majority voting, Hamming codes, etc, provided the error correcting code used can correct a maximum number of errors that can occur in the n-bit response.

The first time the n-bit response has been generated, redundancy information for the response is produced using the chosen error correcting algorithm and error correcting code. This step establishes the response (and associated key). The redundancy information is termed the syndrome for many error correction schemes, and the syndrome is used to correct a subsequent noisy response to the reference response. Generally speaking, syndrome-based error-correcting codes are characterized by a 3-tuple (n, k, d). The value n is the length of the code word, k is the dimensionality of the code word space, i.e., $2^k$ is the number of code words, and d is the minimum distance between code words. The number of errors that are guaranteed to be corrected by a code is t, where d=2t+1. The key generator 100 produces an n-bit response. A syndrome encoder 310 accepts the n-bit value and writes out a syndrome that is typically n−k bits, though it could be longer in some schemes. The code is chosen so correcting t errors in n bits is enough to produce a reliable key. The syndrome can be stored in any type of non-volatile memory on chip or off-chip. For example, it can be stored on programmable fuses or EEPROM on or off chip. The challenge and syndrome are public, knowledge of these does not help the adversary determine the n-bit response or the associated key.

While we will mostly refer to syndrome-based error correction schemes, other schemes such as majority voting can be used as well. We will describe alternate schemes later in this document.

Once the response has been established, the same response can be re-generated over and over even in the presence of noise. Using the syndrome, a noisy response from the key generator 100 that is different from the response produced during the establishment step (from which the syndrome was generated), can be corrected, provided the number of erroneous bits is t or less. (In some cases, more than t errors can be corrected; this is dependent on the distribution of errors and specifics of the code and error correction algorithm used.) Once the n-bit response has been corrected by a syndrome decoder 320, it can be optionally hashed using a one-way hash 330 or any hash function to produce a k-bit key. A reason to hash the response from n bits to k bits is because the syndrome gives away some information about the n-bit response. If the syndrome is n−k bits, the remaining secret in the response essentially has n−(n−k)=k bits. Hashing gives us a k-bit secret key where all the bits are secret. The value of k can be made as long as required by lengthening n.

The error correction steps of syndrome encoding and decoding may be implemented in hardware, i.e., using logic gates, or using software that runs on a processor, or as a combination of software and hardware.

To generate multiple keys, a key generator that accepts a different challenge for each key value is used to produce a response that depends on the challenge and the single key. Different keys will, in general have different challenges and different syndromes.

As described, the only the chip knows the key and no other entity needs to know the key. In some applications, the chip can encrypt data using the key and store the data on chip or externally and then decrypt the data when required. No other entity can decrypt the data without the key. However, in many applications we would like to share the key with other chosen entities, which can be devices, programs, or service providers, to enable a more diverse set of applications.

2 Sharing Secret Keys with Another Entity

In many applications, it is desirable to share a secret key generated in a device with another entity. For example, if the entity is a service provider, the entity can provide protected content to the device in such a way that only authorized devices can use the protected content and/or the device can only use content that is authorized by a suitable content provider. There are a number of ways in which such a service provider can be put in possession of a key known also to the device but that is secret from other parties. Note that the discussion below refers to a "service provider," but the reader should be aware that in related scenarios, the service provider could equally well be another device, a program, or a user.

Figure 4:
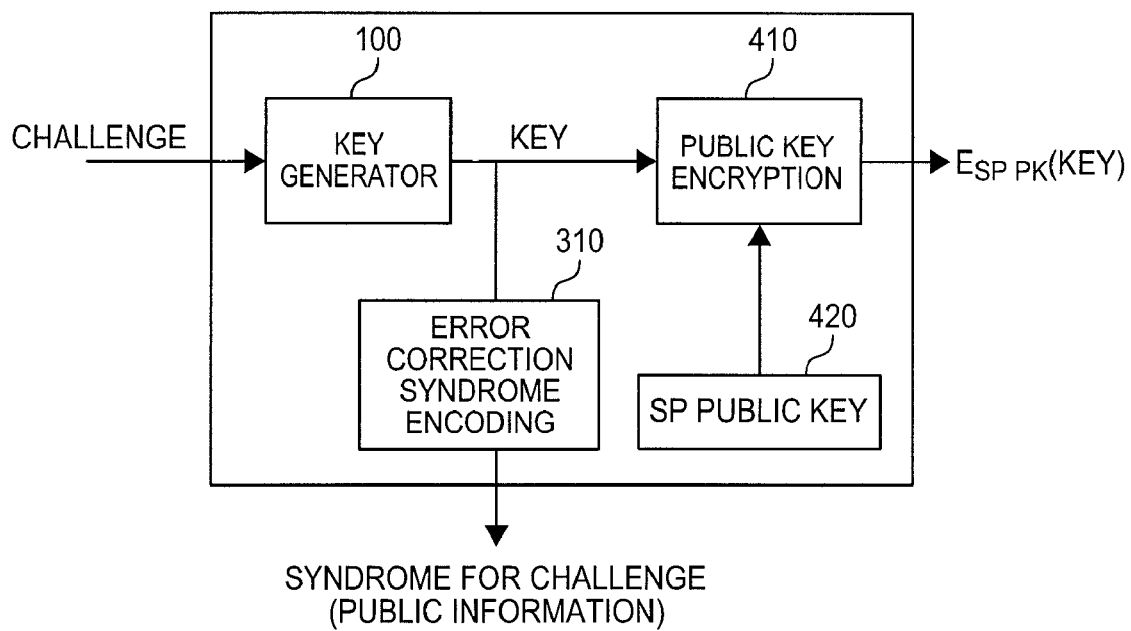
FIG. 4 is an encrypted key generator.

Referring to FIG. 4, one approach to sending a generated key to a service provider makes used of public key encryption 410 on the device, using the service provider's public key 420. The unencrypted key generated in the device is not passed in the open to the service provider so cannot directly be obtained by eavesdropping on the communication from the device to the service provider. Note that as discussed further below, such encryption may not be sufficient to protect the generated key from other types of attacks.

Figure 5A:
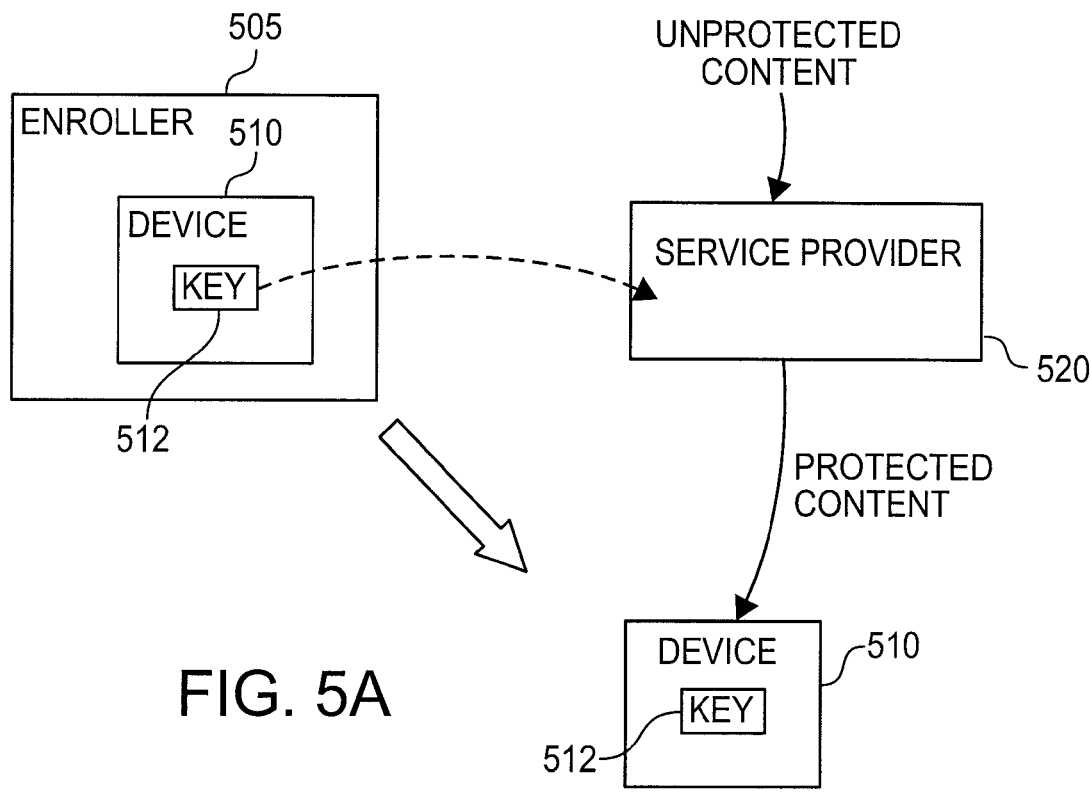
FIGS. 5A and 5B are block diagrams related to content distribution from a service provider.

Referring to FIG. 5A, in one approach to sharing a secret key 512 between a service provider 520 and a device 510, an enroller 505 sets or determines a key 512 in the device. For example, the enroller may be a manufacturer of the device or a system or a system integrator that embeds a component in the device that includes the key generation circuit. For example, the device may be a television program decoder, or a portable media player. The enroller may determine the key by obtaining an output of the key generator or may determine an offset that is to be combined (e.g., XORed) with the output of a key generator to yield a desired key and storing the offset in or in conjunction with the device. The enroller 505, knowing the key 512, provides the key to the service provider in some suitably secure manner. The enroller 505 then sends the device 510 for deployment. Once deployed, the service provider 520 can accept unprotected content from a source of content (e.g., a music publisher) and encrypt the content to form encrypted content that it can send in the open to the device 510.

Figure 5B:
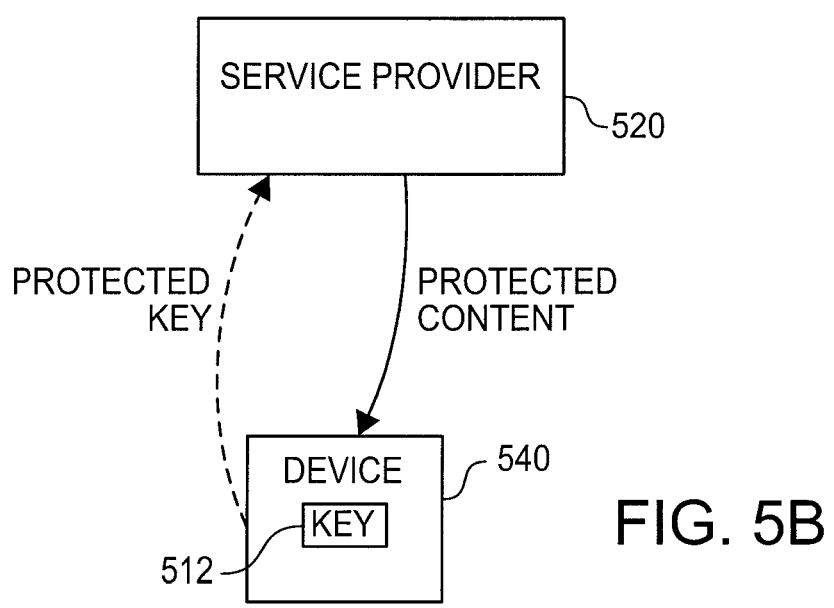

Referring to FIG. 5B, another approach does not necessarily require that the key used to protect the content is known to any party other than the service provider. In this approach, a device 540 includes a key generator, for example of the structure shown in FIG. 4, that permits it to first generate an internal key $K_R$ as described above. Then, the device encrypts $K_R$ with the Service Provider's public key 420, SP-PK, which is hard-coded on the chip (and which can be exposed as public information) and sends back to the service provider $E_{SP\_PK}$ ($K_R$), a protected version of the key. Only the device and the service provider know $K_R$ since the service provider can decrypt the encrypted $K_R$ using SP's private key, which is known only to the service provider. The device can reliably re-generate $K_R$, for example, using the syndrome at any time after key establishment.

The service provider 520 can send data encrypted by $K_R$ that only the device 540 can decrypt. The service provider can share a specific secret or another private/public key pair with the device using an offset from $K_R$ or send the chip an encrypted challenge that generates a new response/secret. That is, to share a new key $K_N$ with the device, the service provider can simply send an offset=$K_N$ XOR $K_R$ to the chip, and the chip will generate $K_R$ and compute $K_N$ as $K_R$ XOR offset. This works because $K_R$ XOR offset=$K_R$ XOR ($K_N$ XOR $K_R$)=$K_N$. Exposing the offset does not matter because $K_R$ and $K_N$ are secret. Note that $K_N$ can be a secret key that is unique to each device 540 even if $K_R$ is the same for two or more devices by choosing the appropriate offset for each chip. $K_N$ can be the same for a set of devices even though $K_R$ is different for devices within the set, again by choosing an appropriate offset for each chip.

Using a key generator in this way, a service provider can set a specific key $K_N$, for example, by using the offset method described above. Therefore, devices can be programmed or re-programmed in the field to be able to generate such specific keys, which are volatile in the sense that they are not stored or determinable from any values stored in the device. These volatile keys are hardware keys with regard to their security level, but are programmable like software keys. These keys can be used in essentially any cryptographic scheme.

The public key encryption used in this approach can be carried out using essentially any method for public key encryption including, but not limited to, RSA, Discrete Log, or elliptic curve methods. The encryption can be implemented in hardware or software or as a combination of software and hardware.

3 Authenticating Devices

In some applications, in addition to or rather than protecting content that is passed to the device, the device must be authenticated. For example, in some applications a service provider does not send any content, protected or not, to a device that has not been authenticated.

In authentication applications, the protected key generated as in FIG. 5B, $E_{SP\_PK}$ ($K_R$), can serve as the device's public identifier. If uniqueness of identifier is required, a short unique serial number can be added to $K_R$ prior to encryption or $K_R$ can be made long enough to lower the probability of two chips producing the same $K_R$ down to virtually zero.

Figure 6A:
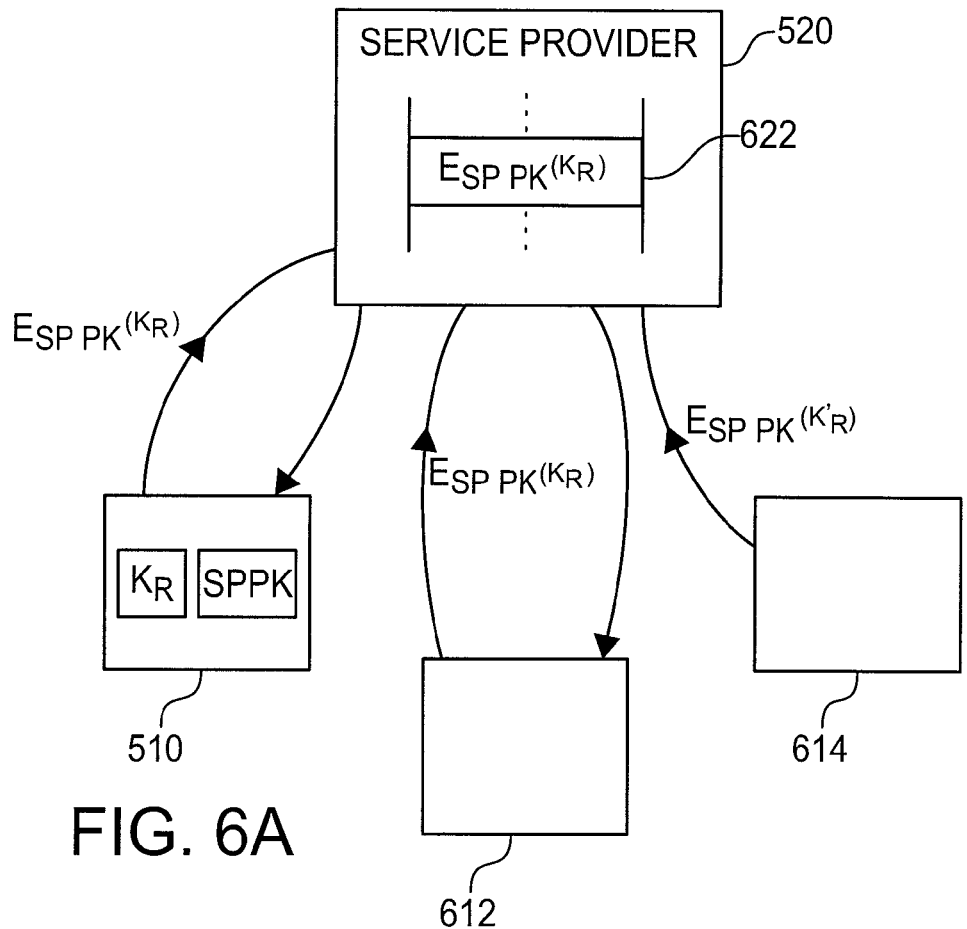
FIGS. 6A and 6B are block diagrams related to authentication approaches.

Referring to FIG. 6A in this approach, an adversary cannot fully impersonate device 510 even if he knows $E_{SP\_PK}(K_R)$ for that device, since he does not know $K_R$ for that device.

If an adversary has a fake device 612 for which $K_R$ is exposed, the service provider should ensure that an $E_{SP\_PK}$ ($K_R$) message from a fake device with an exposed $K_R$ is not treated as a legitimate message from a legitimate device. For example, if $K_R$ were to be given away by the fake device or discovered by a thief or even by the device's owner in the case of Digital Rights Management applications, further devices could be treated by the service provider as authorized when they should not be. Therefore, we need to authenticate legitimate devices and not authenticate fake ones. There are a number of options possible for such authentication including, but not limited to those described below.

Option 1: Referring to FIG. 6A, a list of legitimate devices, or legitimate identifiers, corresponding to $E_{SP\_PK}$ ($K_R$) messages is created after the devices have been fully fabricated. The list 622 is known to the service provider 520, and can be public, because knowing it does not help the adversary. An authorized device 512 provides the value $E_{SP\_PK}$ ($K_R$) to the service provider 520, which in turn provides content protected by $K_R$. Because $K_R$ is needed to make use of content provided by the service provider, such content cannot be used by a fake device 612 that only knows $E_{SP\_PK}$ ($K_R$). Furthermore, a device 614 that does not even know a valid value of $E_{SP\_PK}$ ($K_R$) receives no service from the service provider.

Figure 6B:
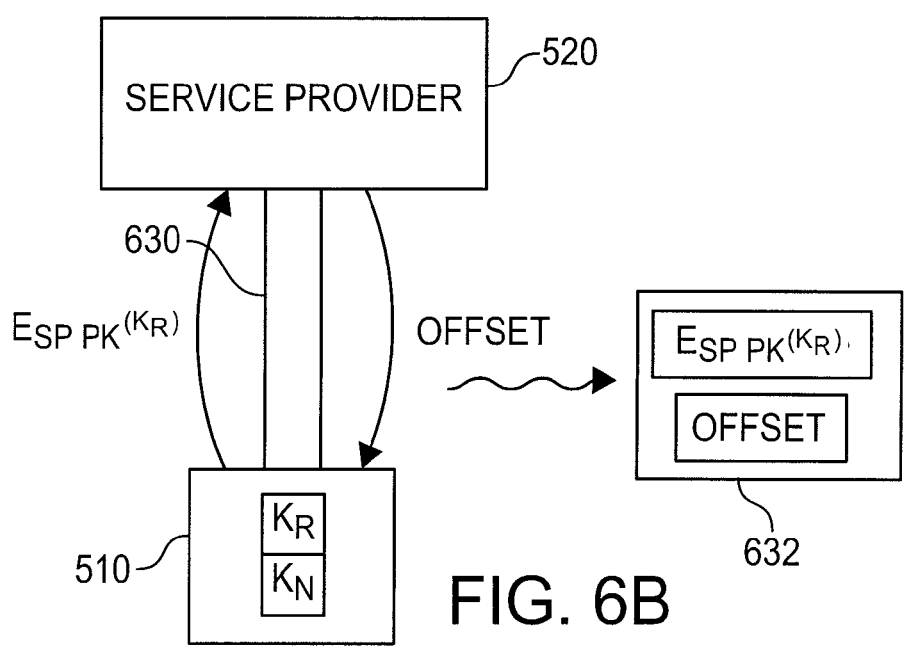

Option 2: Referring to FIG. 6B, in another option, a point-to-point network connection 630 between the device 512 and the service provider 520 is established from a location where someone is watching to make sure that the device 512 is legitimate, and not, for example, a person with a laptop with $K_R$ exposed and providing $E_{SP\_PK}$ ($K_R$)). Eavesdroppers 632 are allowed at the location. Then, $E_{SP\_PK}$ ($K_R$) is sent from a device to the service provider 520 over the link 630. The service provider can record $K_R$ as a valid key with which to protect data sent to the device. Optionally, the service provider computes an offset that is sent back to the device corresponding to a specific key or common key $K_N$. The offset can be stored on the device in a public manner. The offset gives no information to an eavesdropping adversary since he does not know $K_R$. There is no need to maintain lists of legitimate devices in this case since only legitimate devices know the specific or common key. After deployment, device can be further customized with a specific symmetric or private key if necessary.

Option 3: To make creation of fake devices more difficult, manufacturer can make each device send out $E_{SP\_PK}$ ($K_R$@Z) where Z is an unpublicized code hard coded in ROM and common to all chips or a large set of chips and @ indicates a concatenation operator. Many other simple unpublicized protocols can be used that will require extensive reverse engineering and internal knowledge of chip by an adversary to be discovered. For example, the device is programmed to send out $E_{SP\_PK}$($K_R$) and $E_{SP\_PK}$($K_R$+1). These look unrelated to an eavesdropping adversary. This will allow easy detection of fake messages since the provider can check for Z or the specific protocol after decryption. In this option, we do not require the maintenance of lists.

4 Sharing Secret Keys with Multiple Entities

In situations in which multiple service providers or other entities need to authenticate or securely communicate with a device, the device can maintain a list of the public keys of all the service providers. However, if the same internal key $K_R$ is provided by the device to multiple service providers, each encrypted by that service provider's public key, one such service provider could eavesdrop on communication from another of the service providers to the device since $K_R$ is could be known by all the service providers. In some applications, this may be acceptable for example, if there are a small number of service providers, while in other applications such a situation is not acceptable.

Figure 7:
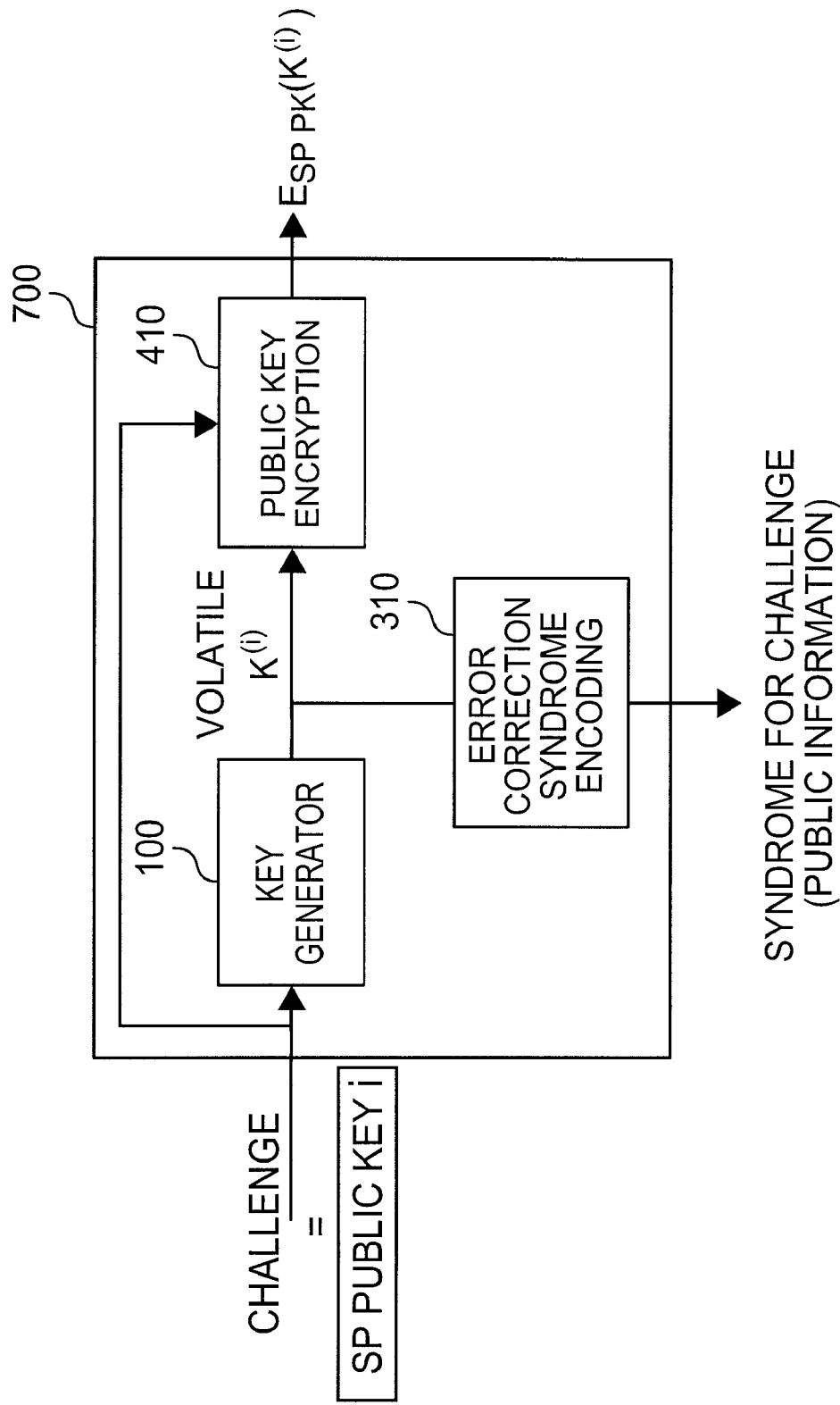
FIG. 7 is a key generator.

Referring to FIG. 7, another approach restricts what secrets can be shared with any particular service provider. In this approach, the key $K^{(i)}$ generated by the device for each service provider (i) is different, and is provided to that service provider using a public key specific to that service provider. Specifically, a challenge to the key generator 100 that is equal to or dependent on the service provider's public key determines the value of the key as well as the public key is used for encryption 410 of the key. This restricts which entities that can learn the output of the key generator for that challenge. Optionally, a syndrome is written out to establish the key as described above, but this does not compromise the key. If another service provider B applies the public key of a service provider A, B cannot decrypt the response, only service provider A can. If on the other hand B provides its own public key as the challenge, then the incorrect key is output from the key generator.

It is not necessary that the challenge applied to the key generator be identically the service provider's public key. For example, the input to the key generator can be a hash of the public key. Also, the hash function can include both the public key and a second input, a "sub-challenge." If the hash function is not invertible, a service provider B cannot determine a suitable sub-challenge to combine with its public key to yield the same input to the key generator as A's public key and the sub-challenge provided by A. One service provider (or multiple service providers sharing the public key) can generate multiple keys for the same public key using different sub-challenges. Further, the output of the key generator can be optionally hashed prior to public key encryption. Hashing the output of the key generator can thwart model-building attacks where an adversary attempts to apply numerous public key challenges to the device for which he knows the corresponding private keys and attempts to construct a model of the key generator. Using the model, he predicts what the response will be for a public key that he does not know the private key for. By placing an output hash, the adversary is forced to invert the hash in order to carry out a model-building attack on the key generator. Using a one-way or random hash can make the adversary's job computationally very hard.

As before public key encryption can be carried out using any method for public key encryption including, but not limited to, RSA, Discrete Log, or elliptic curve methods. The encryption can be implemented in hardware or software or as a combination of software and hardware.

5 Introducing a Device to a New Entity

Figure 8:
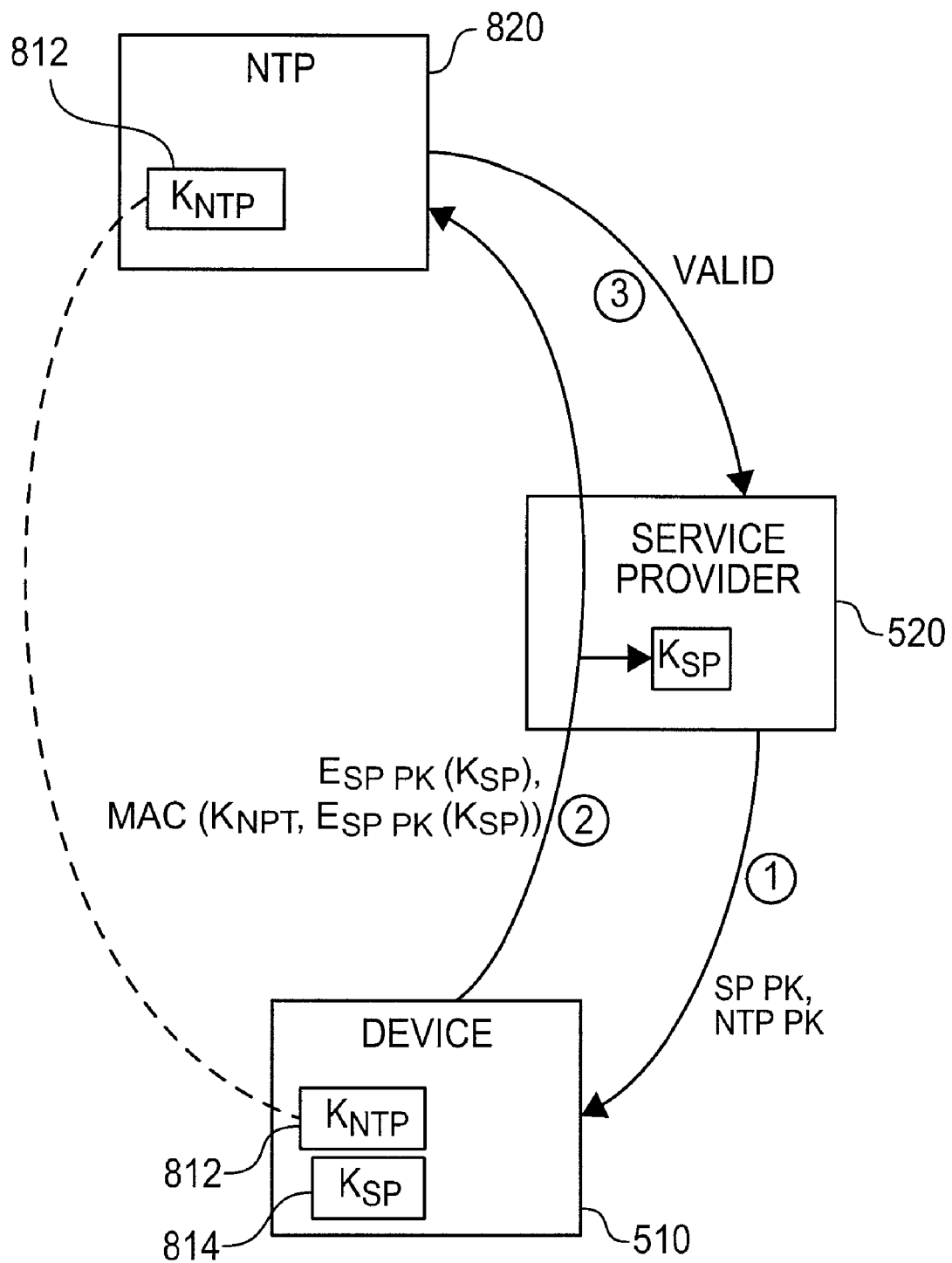
FIGS. 8 and 9 are block diagrams related to introduction by a third party.

Referring to FIG. 8, in some applications, a device 510 and a third party 820, referred to below as a "Neutral Third Party (NTP)," share a secret key, $K_{NTP}$ 812, which was established using one of the techniques described above, for example, using a point-to-point connection as shown in FIG. 6B. The NTP can be a device, a program, a user or a service provider. Another service provider 520 (or equivalently another device, program, user or service provider) later wishes to authenticate and establish a new shared secret with the device 510. The service provider 520 desires, for example, to be sure that the device 510 is not a fake device (such as fake device 614 in FIG. 6A). The approach illustrated in FIG. 8 takes advantage of the fact that the NTP 820 and the device 510 already share a secret and that NTP 820 regards device 510 as authentic allowing the NTP to "introduce" the device to the new service provider 520, essentially vouching for its authenticity.

In FIG. 8, we assume that the device is already deployed, for example, with a customer, and that prior to deployment, the device was queried with the NTP's public key, NTP PK, and responded with $E_{NTP\_PK}(K_{NTP})$, where $K_{NTP}$ is a key generated when an input that depends on NTP PK is applied to the key generator. The following sequence of steps completes the introduction:

Step 1: The device 510 connects to a service provider 520, and the service provider sends the device its public key, SP PK, and the NTP's public key (if the device does not already have a copy).

Step 2: The device uses the service provider's public key (SP PK) to generate a secret $K_{SP}$ and encrypts the secret $K_{SP}$ with the service provider's public key. The device also generates the secret $K_{NTP}$ shared with NTP using the NTP's public key (NTP PK). The device then sends the $E_{SP\_PK}(K_{SP})$ message and a message authentication code (MAC) for $E_{SP\_PK}(K_{SP})$ to the service provider 520, which forwards both the responses to the NTP 820. The message authentication code is, for example, $E_{SP\_PK}(K_{SP})$ encrypted with $K_{NTP}$. Other techniques for message authentication can be used based on the secret $K_{NTP}$.

Step 3: the NTP verifies that the MAC and $E_{SP\_PK}(K_{SP})$ that are forwarded from the service provider match. It can check this because it knows $K_{NTP}$. However, the NTP cannot decrypt $E_{SP\_PK}(K_{SP})$ to determine $K_{SP}$ since it does not know the SP's private key. If the NTP deems the device to be valid it informs the service provider of the device's authenticity. The service provider now has a shared secret $K_{SP}$ with a valid device, and can communicate securely with the device and perform any necessary transactions in a secure manner.

If error correction approaches are used for the keys, we assumed that the syndromes required to correct the generated keys are available to the device, either because they are stored on the device, or because each service provider or NTP maintains them. The syndrome can be viewed as information that is appended to the corresponding public key.

Figure 9:
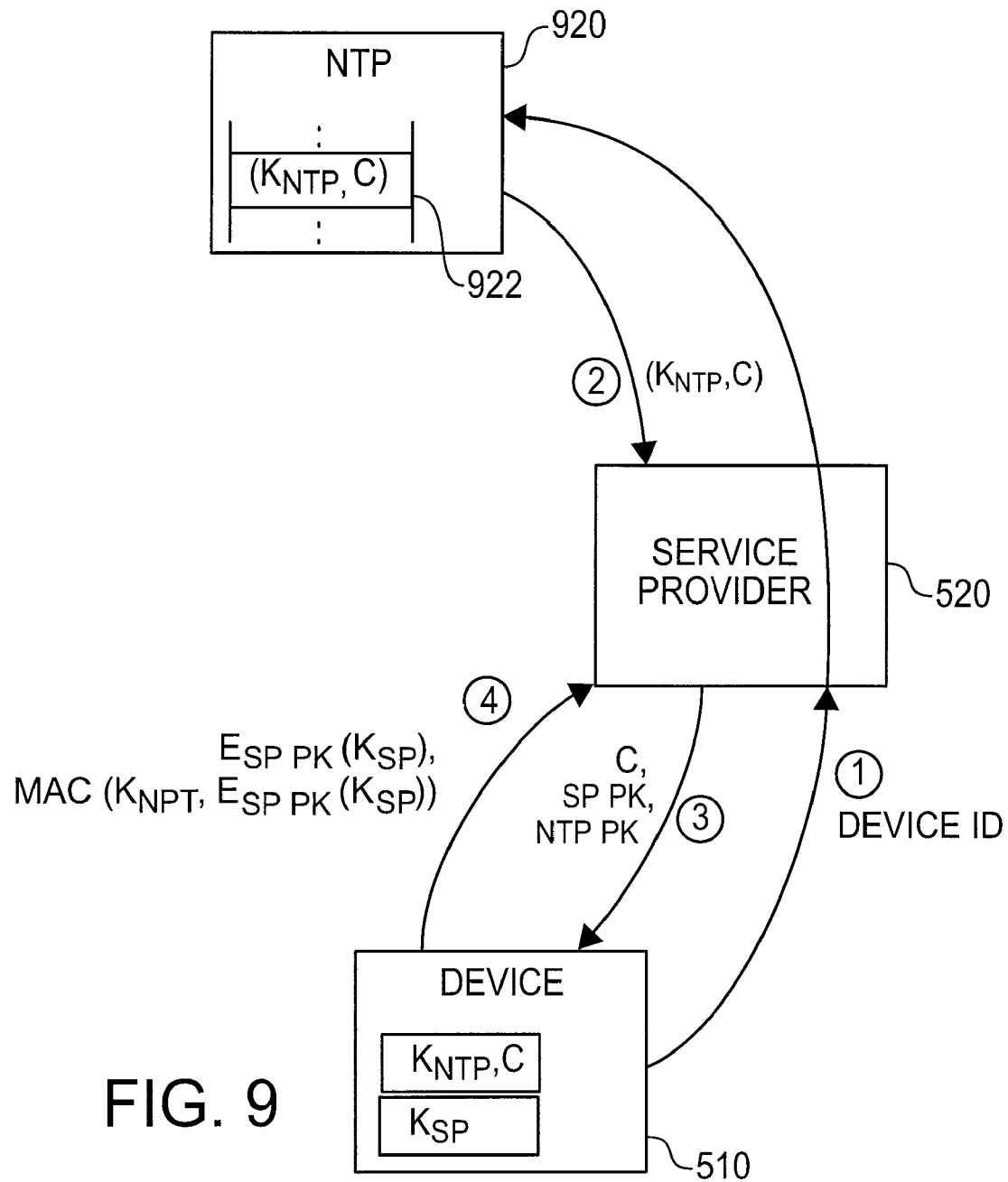

Another variant of an introduction approach is illustrated in FIG. 9. In this approach, the NTP 920 has generated a number of different keys shared with the device 510, each using a different sub-challenge that is combined with the NTP public key.

In Step 1, the device connects to the service provider and sends its identifier that corresponds to the NTP's public key and a particular sub-challenge. The sub-challenge can be included as part of the identifier, or can be a fixed sub-challenge. This message is forwarded to the NTP.

In Step 2, the NTP checks that the device is valid by checking the device identifier against its list 922. If the device is valid, NTP sends the service provider a sub-challenge C and a device response R for that sub-challenge that no other entity knows.

In Step 3, the service provider sends the device its public key, the NTP's public key and the sub-challenge C. It will also send any required syndrome for the response R. This was either computed by NTP and given to the service provider or re-computed by the service provider given knowledge of the error correction scheme used.

In Step 4, the device sends a message $E_{SP\_PK}(K_{SP})$ and a MAC for $E_{SP\_PK}(K_{SP})$ based on R to the service provider. The device can generate R because it is given the NTP public key and sub-challenge C (and any required syndrome). The service provider can check that the message matches the MAC, and if so, has a shared secret $K_{SP}$ with a valid device.

6 Generating Public/Private Key Pairs

In approached described above involving public key techniques, a private-public key pair can be generated external to the device for example by a service provider, and the public key is provided to the device It is also possible to generate volatile private keys that correspond to a private/public key pair on a device itself, so only the device knows the private key. For some public key encryption schemes, the private key corresponds to a random number x, and the public key is generated from x using exponentiation.

Figure 10A:
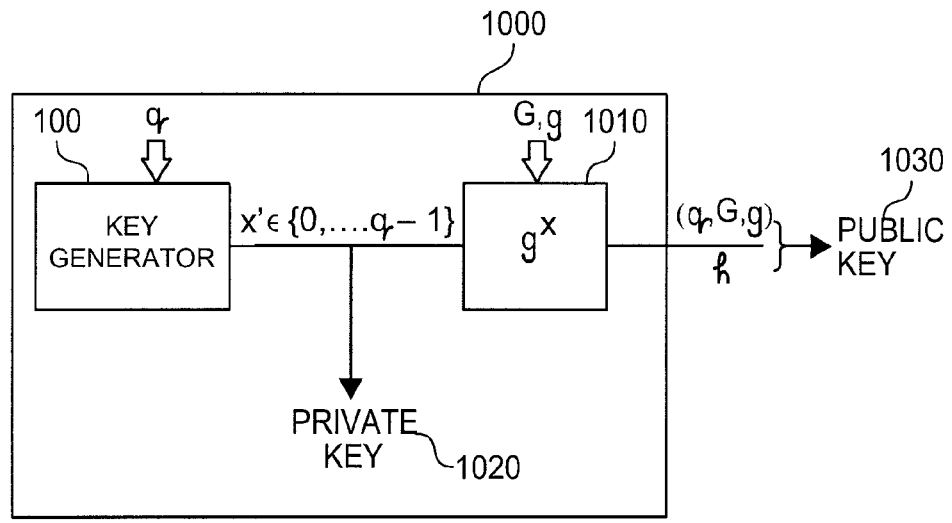
FIGS. 10A and 10B private/public key generators.

Referring to FIG. 10A, in one example of this approach the E1 Gamal scheme is used in a device 1000. An efficient description of a cyclic group G of order q with generator g is used on the device. The device implements a random number generator using a key generator of a type described above suitably modified to output a value in the range 0 to q−1. The device then computes $h=g^x$ over the cyclic group in a module 1010, and outputs h. The public key 1030 for the device is then h, along with the description of G, q, g. The device retains x as its secret private key 1020.

The secret key, x, is never exposed outside the device or stored in non-volatile form and is only known to the chip. Once computed using exponentiation, the public key can be written into non-volatile storage on the device or external to the device and can be published. The computation of the public key can be performed in hardware or software or a combination of both.

Figure 10B:
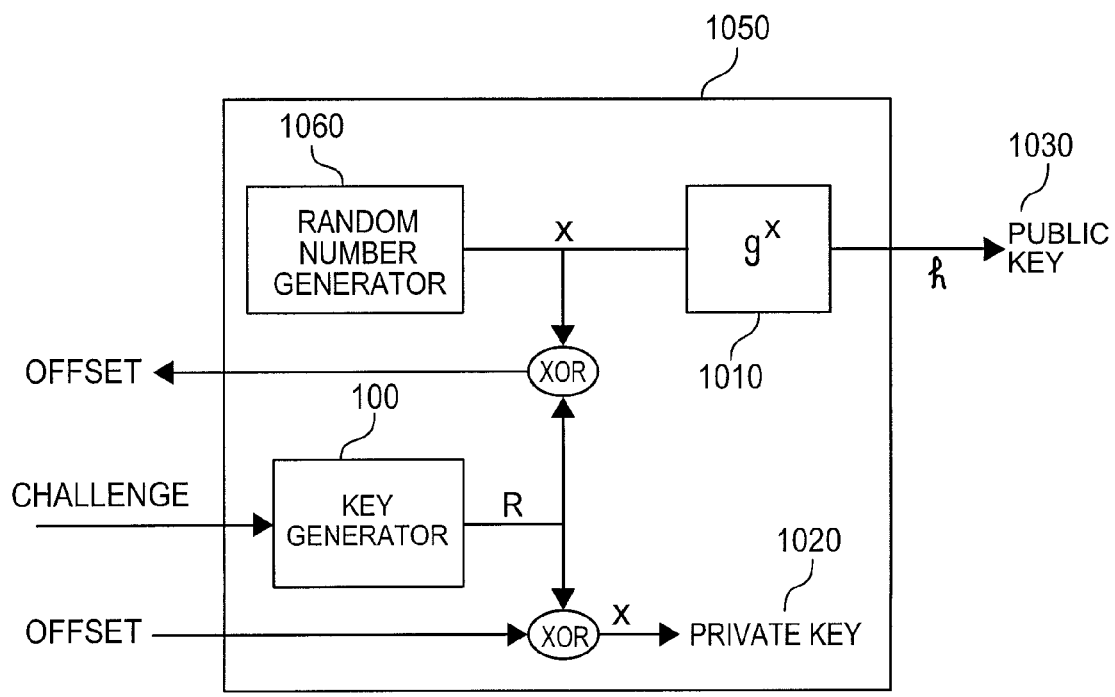

Referring to FIG. 10B, alternately, rather than using the key generator directly to produce secret x, the device 1050 includes a random number generator 1060 that uses randomness for any hardware or software source or the environment to generate a random value x. Then, the device uses the key generator to produce a response, R, for a particular challenge. The device writes out the syndrome for that response, and writes out offset=R XOR x. The device can always regenerate x by re-generating R, correcting it if necessary, and XOR'ing the corrected response with the offset. Once x has been established, a public key based on x can be generated in the device using software or hardware or a combination of both.

Many different crypto-systems have similar key generation schemes to that described above including the Diffie-Hellman and elliptic curve cryptosystems. The technique as described is also applicable to these types of cryptosystems. In the RSA cryptosystem, the private key is not a random number. Here, more work needs to be done to generate the private key, however, a volatile RSA private key can be generated as described below.

For RSA key generation, given a challenge, the key generator produces a response. The syndrome for the response is written out and the response established. This response is used by the device to generate a pair of primes and eventually an RSA private/public key pair using established key generation methods. A fraction of the work of key generation can be off-loaded to a potentially untrustworthy server without compromising security. This process can be deterministic or random as long as it depends on the starting point, i.e., the response. The generated public key is written out, and offset=R XOR private-key is written out. (Optionally, a different response can be used here obtained from a different challenge, and/or the response can be one-way hashed prior to XOR'ing.) Any time the private key is required, the chip simply re-generates R, corrects it using the syndrome, and computes offset XOR R which produces the private key. Again, we have a situation, where only the chip knows the private key and the private key is only present in volatile form.

In a variation of the above RSA key generation scheme, in the first step, a random value x can be generated using randomness from a hardware or software source. The value x can then be established using a response from the key generator to a particular challenge by writing out an offset as described above. This random value x is then used by the device to generate a pair of primes and eventually a private/public key pair.

Once the public key has been computed, the device can broadcast its public key and it can be registered with a Trusted Third Party (TTP). One can optionally send the private key to the TTP encrypted with the TTP's public key for backup/recovery of data encrypted with the private key.

7 Error Correction

Alternate error correction methodologies are also possible. Key establishment is the same as before. However, when re-generating the key, the syndrome for the potentially noisy response, R', is computed and transmitted outside the chip. Now, an external entity can decode the two syndromes for R and R' to produce the error vector, i.e., R XOR R'. The external entity cannot discover R or R' during decoding. This error vector can then be transmitted back to the device so the device can correct R' and obtain the established R. In an alternative syndrome-based approach, the device computes a syndrome s' for the response R' and provides s' off the device. Outside the device, an error-vector equal to R XOR R' is computed from s'. The error vector is passes back to the device where R is computed from R' and the error vector.

An approach to error correction based on syndromes is described above which, allows a device to correct a response R' to match an enrolled response R based on a potentially public syndrome. This error correction is performed in the device so that R is not exposed.

Figure 11A:
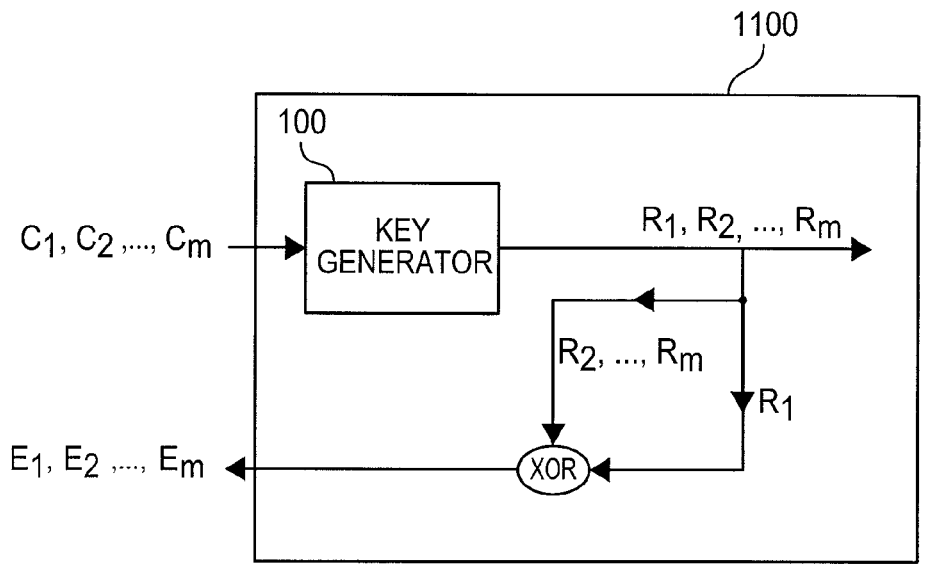
FIGS. 11A and 11B are a key generator which uses voting based error correction.
Figure 11B:
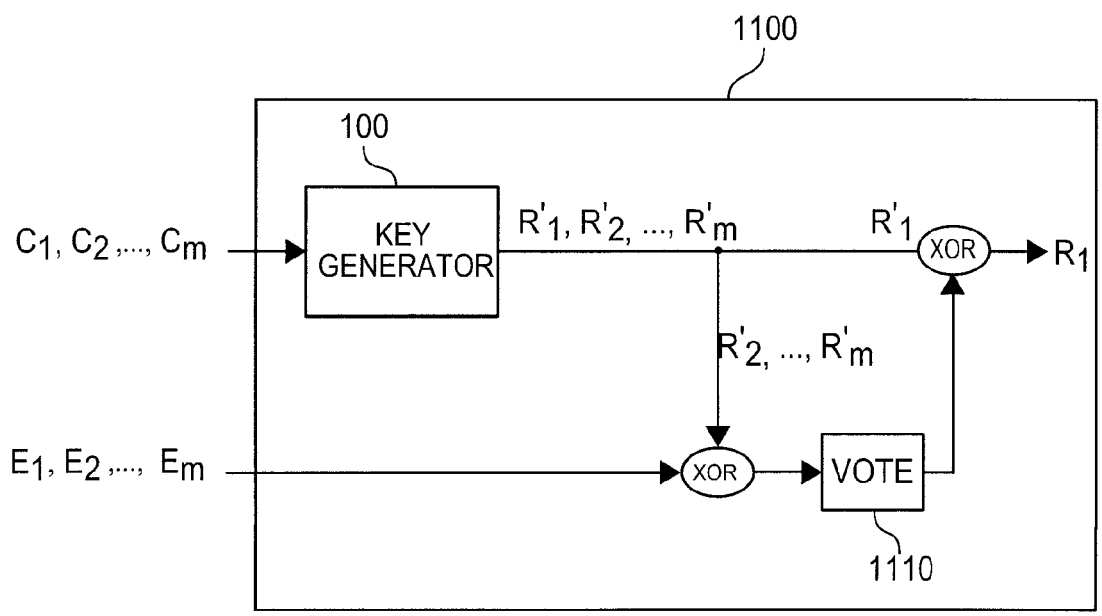

Referring to FIGS. 11A and 11B, another alternative error correction scheme is not based on syndromes, and is rather based on majority voting.

Referring to FIG. 11A. during key establishment, a set of challenges, C1, C2, . . . , Cm are applied to the key generator 100. Rather than writing out a syndrome, the key generator writes out R1 XOR R2, R1 XOR R3, . . . , R1 XOR Rm as the redundancy information. Assume that each of the Ri consists of n bits. We will denote this as E2, . . . , Em, i.e., R1 XOR Ri=Ei, for 2<=i<=m. This redundancy information does not give enough information about R1 to the adversary to guess it, since he does not know any of the R1, R2, . . . , Rm.

Referring to FIG. 11B, during key generation, the device 1110 produces potentially erroneous responses R1', R2', . . . , Rm' using the same set of challenges C1, C2, . . . , Cm. However, by using the E2, . . . , Em error vectors, the device can correct the responses. To do this, the device computes R1' XOR R2' XOR E2, R1' XOR R3' XOR E3, . . . , R1' XOR Rm' XOR Em. With the above m−1 quantities, the device performs a majority vote on each of the n bits to determine the error vector for R1'. Then, R1' is corrected by XOR'ing with the error vector to produce R1, the established response.

This technique works because if R1' is different from R1 in bit i, then most of the $i^{th}$ positions in the error vectors above will with very high probability have 1's. Note that some of these positions may have zeroes because the corresponding Rj' may also have an error in the $i^{th}$ position as compared to Rj, however this is unlikely. Therefore, with large enough m, one can get very low error probability for the estimation of the error vector. Once we have a reliable error vector, we can correct R1' and share a reliable R1 as a secret.

Other schemes are possible to reliable generate volatile keys that are combinations of repeated measurement and majority voting and syndrome based schemes. These schemes can be implemented in software or hardware or a combination of both.

8 Integration with a Processor

Figure 12:
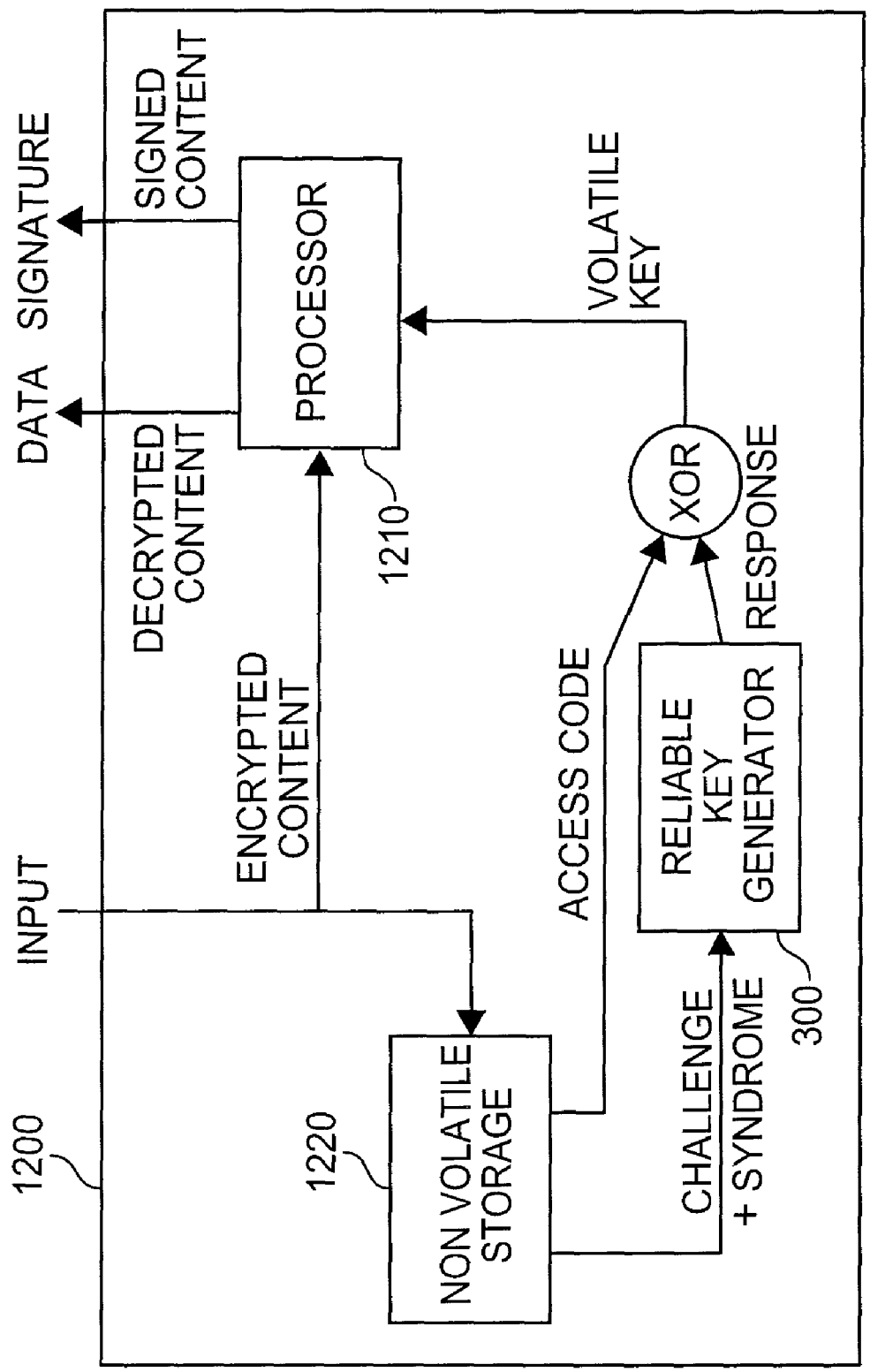
FIG. 12 is an integrated key generator and processor.

Referring to FIG. 12, a volatile key generator, for example, that uses the techniques described above, can be integrated with a general or special-purpose processor 1210, for example on a single integrated circuit 1200. A host of applications can be implemented using such an integrated device, including but not limited to software copy protection, Digital Rights Management of media content, games and software, management of broadcast content and smart card transactions. Examples of devices in which a key generator can be integrated with a processor include but are not limited to smart cards, PDAs, satellite cards, set-top boxes, and dongles.

To share secrets with the integrated device 1200 containing the key generator the methods that can be used include, but are not limited to, the methods based on public key encryption described above and the methods described in the prior art. To share specific keys in a reliable fashion, public challenges, access codes and syndromes or other redundant information can be stored in any type of storage 1220 on the integrated device.

Once a secret has been shared between the service provider and the integrated device, the processor can be sent data that is encrypted with the key, and only the processor will be able to decrypt the data. The processor can also sign data with a key shared with a service provider so the service provider can verify that the processor carried out particular transactions. This key can be a symmetric key or an asymmetric private key.

9 Applications

A key generator integrated with a processor and/or application-specific circuitry or field programmable circuitry can be used in many applications including, but not limited to, the applications described below.

Figure 13:
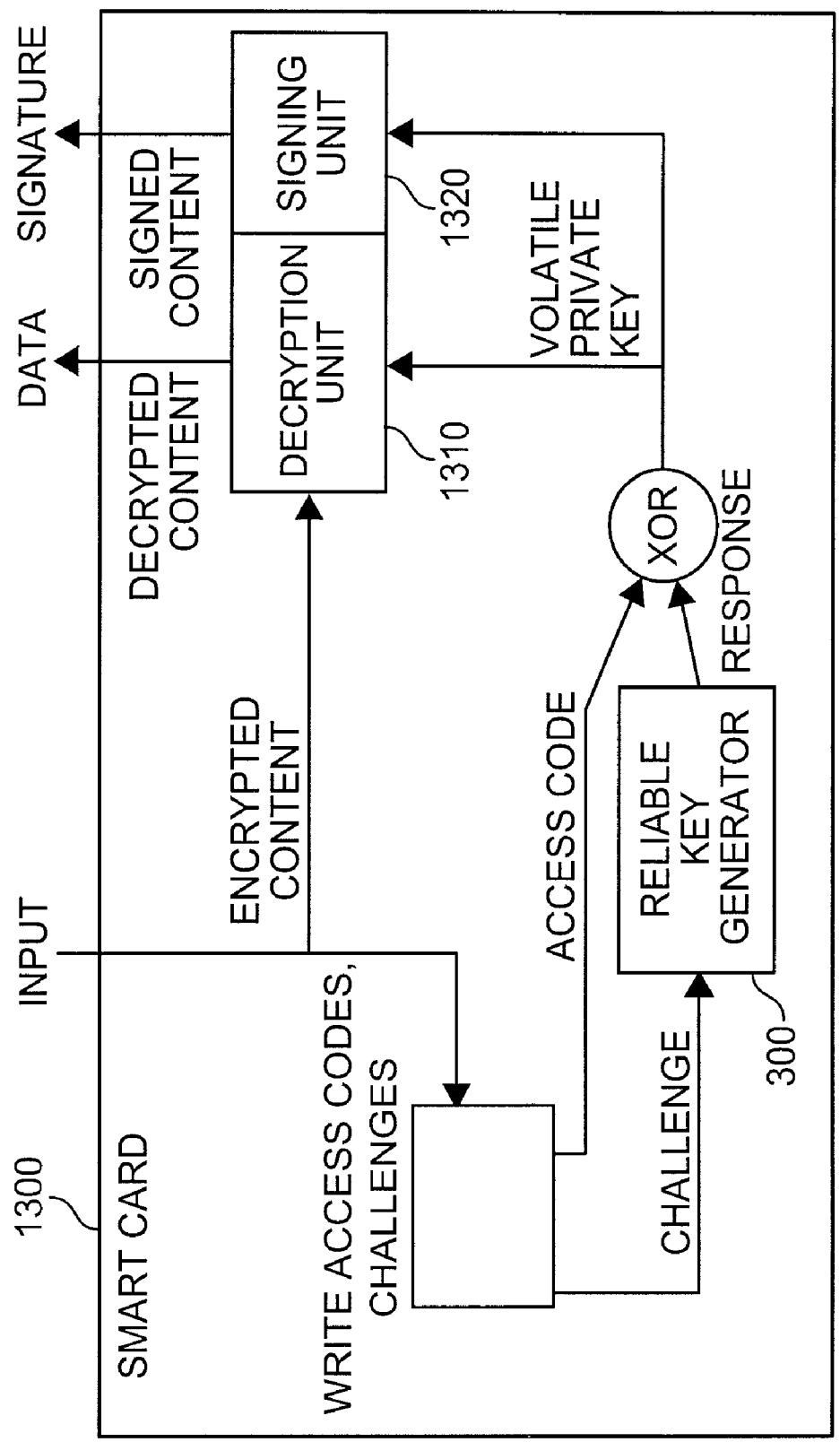
FIG. 13 is a smart card device.

Referring to FIG. 13, a smart card 1300 has a volatile private key that is shared with the service provider (e.g., a credit card company or other financial institution). Data encrypted with the corresponding public key can be sent to the smart card and only that smart card can decrypt the data using an integrated decryption unit 1310. The smart card can also sign transactions using an integrated signing unit 1320 and anyone who knows the corresponding public key can verify the transaction.

In a satellite access card application, a master symmetric key is shared between the card and the satellite TV provider. Streaming media content encrypted with content keys are broadcast to all satellite receivers. In one scenario, the content keys are encrypted with a select set of master keys, corresponding to those receivers that are authorized to view the content and broadcasted along with the content. The card with an appropriate master key can decrypt the content key, and provide the content key to the receiver, which can then decrypt the streaming content. Note that a card can have multiple master keys shared with the same or different service providers. Each master key has an associated challenge, access code and syndrome associated with it so it can be generated reliably. While the content key may be outputted in exposed form from the card, this typically does not pose a problem since the content keys are different for each program or each segment of a program. However, more sophisticated protection mechanisms are not precluded.

Figure 14:
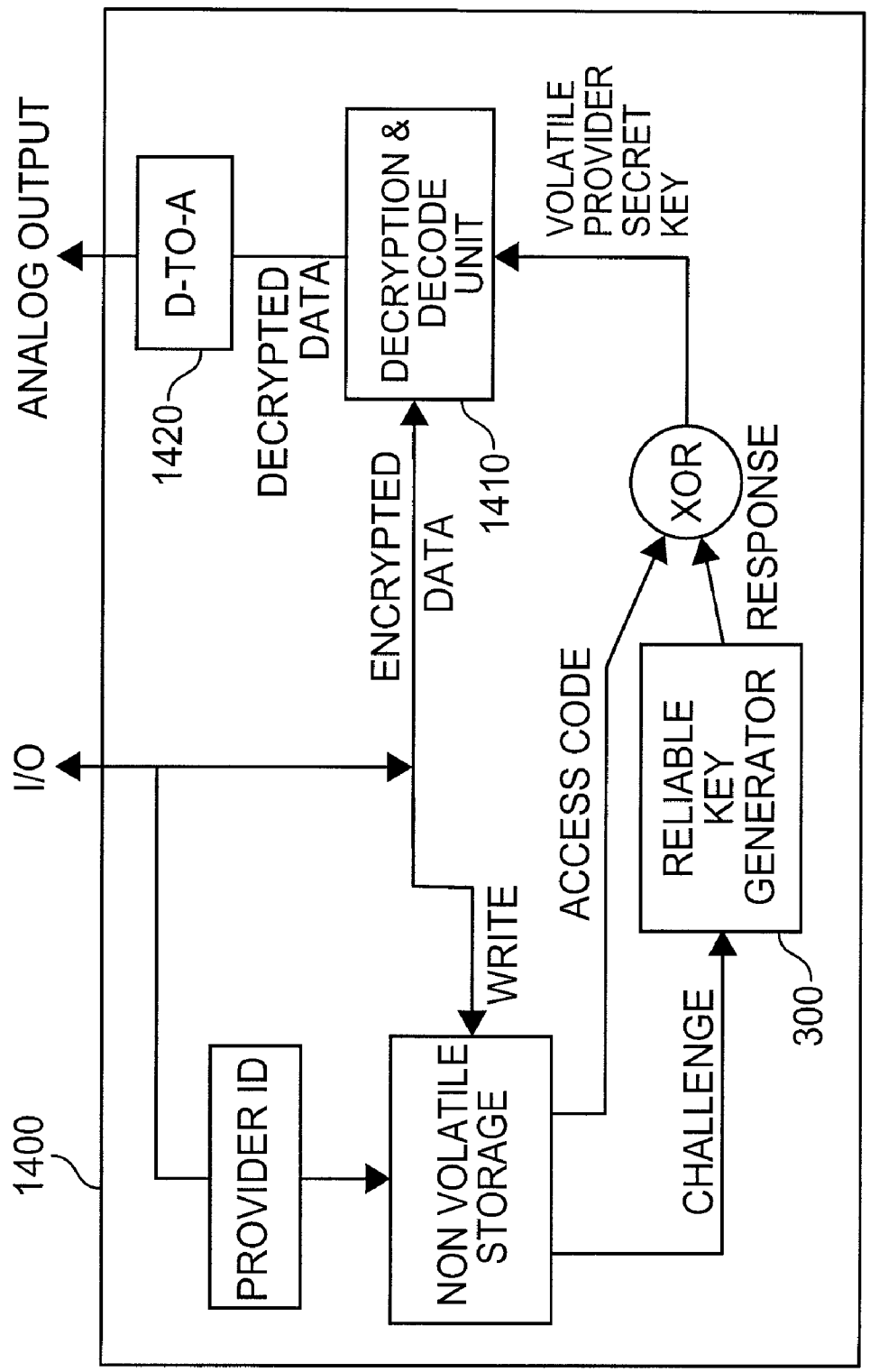
FIG. 14 is a multimedia rights management device.

Referring to FIG. 14, in a multimedia Digital Rights Management application an integrated device 1400 has a decryption and decode unit 1410 for decrypting digital content and decompressing it. A digital-to-analog (D/A) converter 1420 is integrated on the device for converting the content into an analog form. The analog content is suitable to be input to monitors and/or speakers. In this scenario digital content is never exposed in unencrypted form outside the integrated device. In alternative versions, rather than a D/A converted, a non-invertible (e.g., lossy) digital processing can be applied which retains enough information for presenting the multimedia content but does not allow recreation of the full digital content sent in encrypted form to the device.

Figure 15:
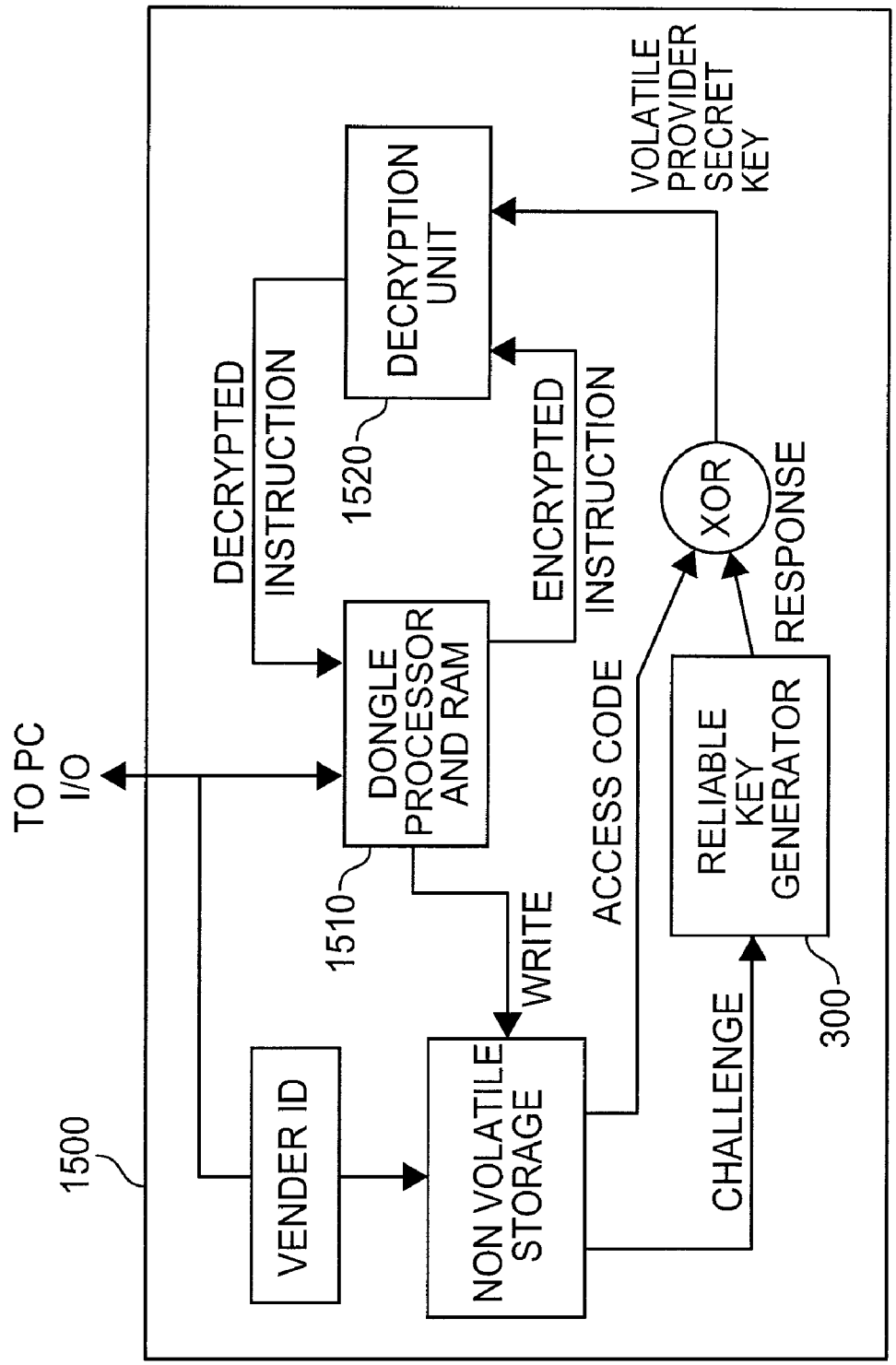
FIG. 15 is a rights management dongle.

Referring to FIG. 15, in a software copy protection application a conventional PC without any Digital Rights Management (DRM) support makes use of a separate device to implement DRM. An example of such a device is a dongle 1500 that is attached to the PC, for example, through a serial port (e.g., USB port) of the PC. Software modules can be purchased on a CD, come preloaded on the PC, or can be downloaded from the vendor's website, in any combination. The software or PC comes with the dongle 1500. The software requires the dongle to be connected to the PC in order to run. Parts of the software are encrypted with a key that the software vendor shares with the dongle. In one scenario (not illustrated in FIG. 15), after the appropriate key has been generated on the dongle, these instructions are decrypted on the dongle and sent back to the PC. However, since the decrypted instructions are exposed at the PC-dongle interface, the adversary can attempt to create decrypted software binaries by tapping the PC-dongle interface. To eliminate this attack, as illustrated in FIG. 15, the dongle decryption unit 1520 decrypts instructions and then the dongle processor 1510 executes them, and sends back the results to the PC rather than sending back the decrypted instructions. In this scheme, since the processor state change (e.g., change in value of a register or other memory location) caused by executing an instruction is highly context dependent and there are exponentially many possible state changes even for a particular instruction, the adversary's job of constructing a decrypted version of the software does not require the dongle becomes virtually impossible.

Another application relates to radio frequency identification devices (RFIDs), and other proximity based identification devices. Such devices are used for applications include in retail sales. In the example of a sales application, RFIDs are used to hold product-identifying information (for example, an electronic product code, EPC), for use in determining a price for an item to which the RFID is affixed. There is a need to prevent unauthorized modification of an RFID, for example, to change the identifying information in the device.

Figure 16:
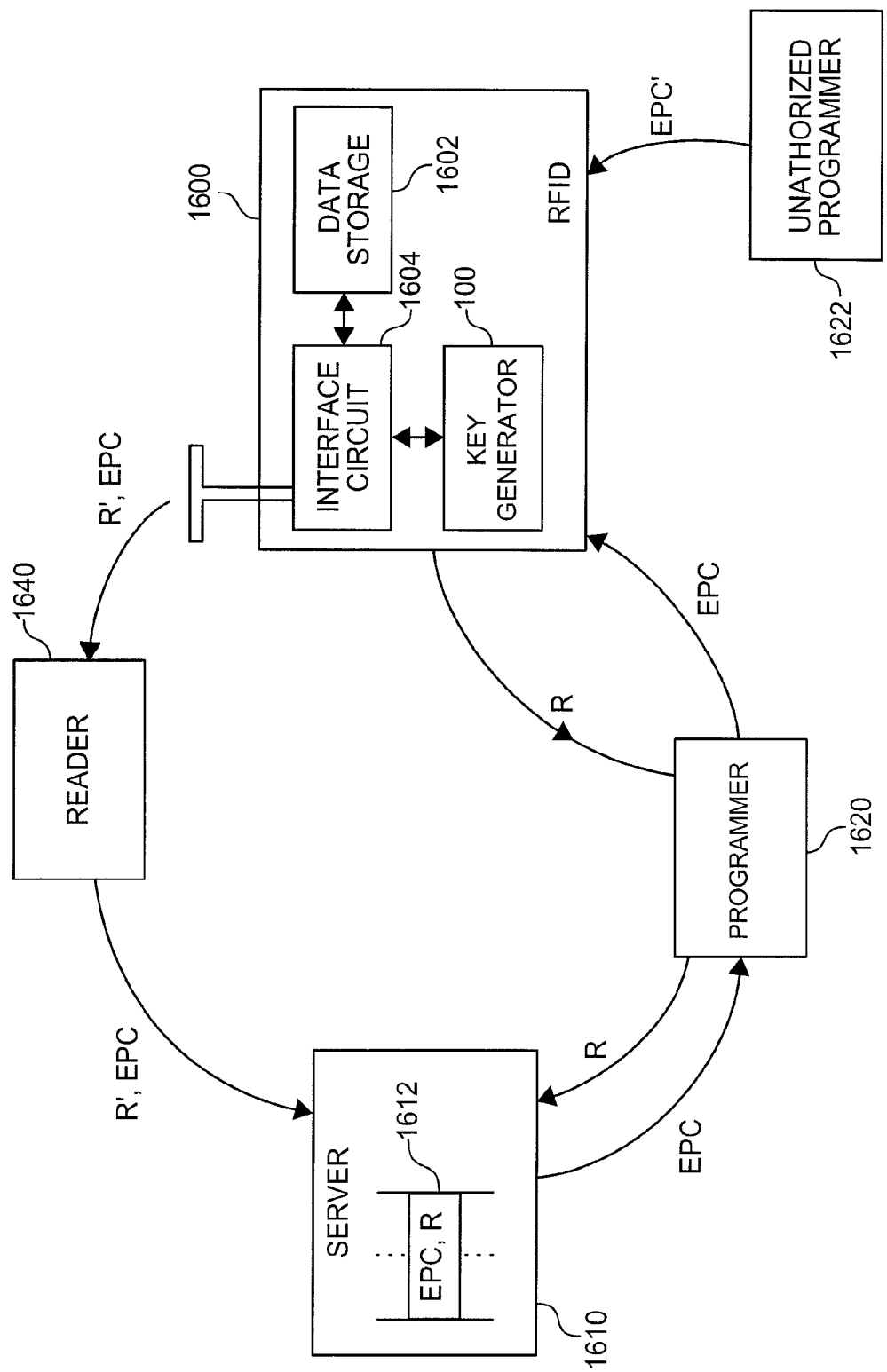
FIG. 16 is a block diagram of a radio frequency identification device (RFID) system.

Referring to FIG. 16, we have an example of an RFID 1600 that is programmable, for example, according to the ISO 15693 standard. The programmed data is stored in a non-volatile data storage 1602. During enrollment of an RFID, an RFID programmer 1620, under the control of a server computer 1610, stores an EPC on the RFID. Later, for example, during checkout in a retail application, an RFID reader 1640, which may be coupled to a point-of-sale terminal, reads the EPC from the RFID.

Today, software that can be executed on a small computer or personal digital assistant (PDA), including the RFDump utility, allows a user equipped with an RFID reader, a laptop or PDA, and a power supply to rewrite the data stored in a tag. In FIG. 16, an unauthorized programmer 1622 represents such equipment. This unauthorized programmer is able to write a modified EPC' onto the RFID.

RFID 1600 in FIG. 16 includes a key generator circuit 100 whose output can be queried by an interface circuit 1604 on the RFID. That is, in addition to querying the value in the data storage 1602, the circuitry can determine the value of the output of the key generator. In the version illustrated, no variable challenge is provided to the generator—in alternative versions of the RFID, the interface circuit can receive the challenge and apply the challenge to the key generator in determining the key output.

During enrollment, the programmer 1620 queries the RFID for the key generator response, R, which it passes to the server computer. The server maintains a list of valid (R, EPC) pairs 1612. Later, when reader 1640 queries the RFID, it retrieves both the stored EPC and the key response, R', which may have bit errors. The reader passes the R', EPC pair to the server, which determines if the response R' is sufficiently close to a stored response associated with the EPC value. In versions in which variable challenges are used, the server 1610 provides the challenge to the programmer 1620 during enrollment, and to the reader 1640 during reading. The programmer and the reader provide the challenge to the RFID, which internally passes the challenge to the key generator. The server records triples of challenge, response, EPC combinations that are valid.

In RFID 1600, the key generator circuit can be designed to be quite small, for example, requiring only a few hundred gates (e.g., 100, 200, 300, or 400 gates). Because of the limited size of the key generator, the incremental cost over conventional RFIDs is small. More sophisticated key generators, or inclusion of additional components described above (for example, cryptographic components) may be justified in some applications, for example, for expensive retail items.

The reader should be able to distinguish between RFIDs that include the key generator and conventional RFIDs that do not. If this is not done using data signals provided by the RFID, physical characteristics, such as color, shape, size or any physical feature that is hard to modify could be used to distinguish the type of RFID.

In order for successful modification of an RFID using an unauthorized programmer 1622, the adversary has to somehow modify appropriate data records 1612 at the server. Even if the adversary has access to the data records 1612, it would still be extremely difficult to modify the RFID to produce appropriate responses without completely destroying the device.

It is to be understood that the foregoing description is intended to illustrate and not to limit the scope of the invention, which is defined by the scope of the appended claims. Other embodiments are within the scope of the following claims.

What is claimed is:

1. A method comprising:
   receiving identification information from a device;
   sending a first challenge to a device, the first challenge selected from a database associated with the received identification information, the database including data characterizing a plurality of first challenges and a plurality of corresponding responses, each response associated with a corresponding first challenge;
   receiving a volatile response from the device, the volatile response determined in the device according to a sequence of challenge values generated in the device on the basis of the first challenge; and
   authenticating the device using the received volatile response and the response corresponding to the sent first challenge.

2. The method of claim 1, wherein the device comprises a proximity device.

3. The method of claim 2, wherein the device comprises a radio frequency identification device (RFID).

4. The method of claim 1, wherein the sequence of challenges is generated by operating on the first challenge with a linear-feedback shift register.

5. The method of claim 1, wherein each challenge included in the generated sequence of challenges includes at least 64 bits.

6. The method of claim 1, wherein each challenge in the sequence of challenges is applied to a circuit in the device to generate a corresponding part of the volatile response.

7. The method of claim 6, wherein each challenge in the sequence of challenges is applied to a corresponding one of a plurality of circuits in the device, each circuit generating a partial response, the volatile response formed from the plurality of partial responses.

8. The method of claim 6, wherein each challenge in the sequence of challenges is applied to the circuit to generate a corresponding one of a plurality of partial responses, the volatile response formed from the plurality of partial responses.

9. The method of claim 6, wherein the circuit is configurable to form any of a plurality of signal paths and application of a challenge to the circuit includes configuration of one of the signal paths.

10. The method of claim 1, wherein the volatile response is dependent on process variation during fabrication of the device.

11. The method of claim 1, wherein the device is one of a group of devices fabricated according to a same design, the volatile response unique in the group to that device.

12. An integrated circuit comprising:
    a communication module configured to communication with an authentication device; and
    circuitry configured to generate a volatile response, the volatile response determined according to a sequence of challenge values generated in the integrated circuit on the basis of a first challenge received from the authentication device, wherein the circuitry is configured to accept each challenge in the sequence of challenges and, for each challenge, to generate a corresponding partial response, the volatile response being formed from the plurality of partial responses;
    wherein the communication module is configured to send the volatile response to the authentication device for authentication of the integrated circuit.

13. The integrated circuit of claim 12, wherein the integrated circuit forms a component of a proximity device.

14. The integrated circuit of claim 13, wherein the integrated circuit forms a component of a radio frequency identification device (RFID).

15. The integrated circuit of claim 12, wherein the communication module is configured to send identification information to the authentication device and to receive the first challenge from the authentication device, wherein the first challenge is selected by the authentication device on the basis of the identification information.

16. The integrated circuit of claim 12, wherein the circuitry to generate the volatile response includes a linear-feedback shift register configured to generate the sequence of challenges based on the first challenge.

17. The integrated circuit of claim 12, wherein each challenge included in the sequence of challenges includes at least 64 bits.

18. The integrated circuit of claim 12, wherein the circuitry to generate the volatile response includes a plurality of subcircuits, each subcircuit configured to accept at least one of the challenges in sequence of challenges and to generate a corresponding partial response based on the accepted challenge, the volatile response being formed from the plurality of partial responses.

19. The integrated circuit of claim 12, wherein the circuitry is configurable to form any of a plurality of signal paths and wherein, in response to an application of a challenge in the sequence of challenges to the circuitry, one of the signal paths is configured.

20. The integrated circuit of claim 12, wherein the volatile response is dependent on process variation during fabrication of the integrated circuit.

21. The integrated circuit of claim 12, wherein the integrated circuit is one of a group of integrated circuits fabricated according to a same design, the volatile response unique in the group to that integrated circuit.

22. A system for authenticating a device on the basis of identification information received from the device, comprising:
a database storing data characterizing a plurality of first challenges and a plurality of corresponding responses, each response associated with a corresponding first challenge;
a selection module configured to select from the database a first challenge associated with the received identification information;
a communication module configured to
send the selected first challenge to the device, and
receive a volatile response from the device, the volatile response determined in the device according to a sequence of challenge values generated in the device on the basis of the first challenge; and
an authentication module configured to use the received volatile response and the response corresponding to the selected first challenge.

23. The system of claim 22, wherein the device comprises a proximity device.

24. The system of claim 23, wherein the device comprises a radio frequency identification device (RFID).

25. The system of claim 22, wherein the device is one of a group of devices fabricated according to a same design, the volatile response determined in the device unique in the group to that device.

26. The system of claim 22, wherein the volatile response is dependent on process variation during fabrication of the device.

27. A method comprising:
determining first challenge at a device, the first challenge selected from a database associated with the device, the database including a plurality of first challenges and corresponding codes, each first challenge corresponding to a code;
determining a volatile response in the device according to a sequence of challenge values generated in the device on the basis of the determined first challenge;
forming a cryptographic key in the device from the determined volatile response and the code corresponding to the first challenge; and
performing a cryptographic function in the device using the formed cryptographic key.

28. The method of claim 27 wherein the database is stored in a non-volatile storage in the device.

29. The method of claim 27 wherein the determined volatile response and the formed cryptographic keys are not stored in any non-volatile storage in the device.

30. The method of claim 29 wherein the code corresponding to the determined first challenge satisfies a constrained relationship between the cryptographic key, the volatile response, and the code.

31. The method of claim 29 wherein the code is determinable from the cryptographic key using the volatile response.

32. The method of claim 29 wherein the cryptographic key is determinable from the code using the volatile response.

33. The method of claim 30 wherein the constrained relationship comprises an exclusive OR relationship.

34. The method of claim 27 wherein the code corresponding to the determined first challenge comprises an encoding of the cryptographic key according to the volatile response.

35. The method of claim 34 wherein forming the cryptographic key comprises performing an exclusive OR operation using the determined volatile response and the code corresponding to the determined first challenge.

36. The method of claim 27 wherein performing the cryptographic function comprises performing a signing operation.

37. The method of claim 27 wherein performing the cryptographic function comprises performing a decryption operation.

38. The method of claim 27 wherein forming a cryptographic key in the device from the determined volatile response comprises forming a private key of a public key and private key pair.

39. The method of claim 38 wherein the formed private key was previously generated in the device using a volatile response to the determined first challenge.

40. The method of claim 38 wherein the formed private key is maintained private to the device without disclosure outside the device.

41. The method of claim 27 wherein the database further comprises error correction data corresponding to each of the first challenges.

42. A method comprising:
determining first challenge at a device;
determining a volatile response in the device according to a sequence of challenge values generated in the device on the basis of the determined first challenge;
determining a cryptographic key in the device, and forming a code from the cryptographic key, wherein at least one of determining the cryptographic key and forming the code from the cryptographic key is based on the determined volatile response; and
repeating determining the volatile response in the device according to a sequence of challenge values generated in the device on the basis of the determined first challenge, and determining the cryptographic key in the device from the repeated determined volatile response and the code.

43. The method of claim 42 further comprising storing data associating the code and the first challenge in a non-volatile storage in the device.

44. The method of claim 42 wherein determining the cryptographic key comprises determining a private key of a public key and private key pair.

45. The method of claim 44 wherein determining the private key comprises using the volatile response to determine the private key.

46. The method of claim 45 further comprising determining the public key corresponding to the private key based on the determined volatile response.

47. The method of claim 42 wherein determining the first challenge comprises receiving the first challenge at the device, and the method further comprises providing the code from the device.

48. An integrated circuit comprising:
a database configured to store a plurality of first challenges and corresponding codes, each first challenge corresponding to a code;
circuitry configured to generate a volatile response, the volatile response determined according to a sequence of challenge values generated in the integrated circuit on the basis of a first challenge received from the database;
a cryptographic key generator configured to accepted the volatile response and a code corresponding to the first challenge; and
a cryptographic module configurable according to a cryptographic key generated in the key generator.

49. A method comprising:
determining first challenge at a device;
determining a volatile response in the device according to a sequence of challenge values generated in the device on the basis of the determined first challenge;
determining a cryptographic key in the device, including determining a private key of a public key and private key pair; and
forming a code from the cryptographic key;
wherein at least one of determining the cryptographic key and forming the code from the cryptographic key is based on the determined volatile response.

50. The method of claim 49 wherein determining the private key comprises using the volatile response to determine the private key.

51. The method of claim 50 further comprising determining the public key corresponding to the private key based on the determined volatile response.

* * * * *